US012471605B2

(12) United States Patent
Elverløv-Jakobsen et al.

(10) Patent No.: US 12,471,605 B2
(45) Date of Patent: Nov. 18, 2025

(54) HIGH PROTEIN, ACIDIFIED, DAIRY PRODUCT, METHOD OF PRODUCING IT, PROTEIN POWDER AND USE THEREOF

(71) Applicant: ARLA FOODS AMBA, Viby J (DK)

(72) Inventors: Jannik Ejnar Elverløv-Jakobsen, Viby J (DK); Allan Eriksen, Viby J (DK); Thea Fihl, Viby J (DK); Torben Jensen, Viby J (DK)

(73) Assignee: ARLA FOODS AMBA, Viby J (DK)

( * ) Notice: Subject to any disclaimer, the term of this patent is extended or adjusted under 35 U.S.C. 154(b) by 885 days.

(21) Appl. No.: 17/437,723

(22) PCT Filed: Mar. 16, 2020

(86) PCT No.: PCT/EP2020/057129
§ 371 (c)(1),
(2) Date: Sep. 9, 2021

(87) PCT Pub. No.: WO2020/187842
PCT Pub. Date: Sep. 24, 2020

(65) Prior Publication Data
US 2022/0142191 A1 May 12, 2022

(30) Foreign Application Priority Data
Mar. 15, 2019 (EP) .................................... 19163310

(51) Int. Cl.
*A23C 9/13* (2006.01)
(52) U.S. Cl.
CPC .................................. *A23C 9/1307* (2013.01)
(58) Field of Classification Search
CPC .............................. A23C 9/12; A23C 9/1307
See application file for complete search history.

(56) References Cited

U.S. PATENT DOCUMENTS

| | | | |
|---|---|---|---|
| 5,096,731 | A | 3/1992 | Singer et al. |
| 6,605,311 | B2 | 8/2003 | Villagran et al. |
| 2010/0021595 | A1 | 1/2010 | Bhaskar |
| 2010/0143538 | A1 | 6/2010 | Bhaskar et al. |
| 2014/0308398 | A1† | 10/2014 | Merrill |
| 2016/0255848 | A1 | 9/2016 | Mikkelsen et al. |
| 2016/0262424 | A1 | 9/2016 | Mikkelsen et al. |
| 2018/0368430 | A1 | 12/2018 | Muuronen et al. |

FOREIGN PATENT DOCUMENTS

| | | |
|---|---|---|
| DE | 102012216990 | 3/2013 |
| DE | 19950240 | 5/2021 |
| EP | 3232796 B1 | 10/2018 |
| WO | 2007110411 A2 | 10/2007 |
| WO | 2008063115 A1 | 5/2008 |
| WO | 2010120199 A1 | 10/2010 |
| WO | 2011099876 A1 | 8/2011 |
| WO | 2014169171 A2 | 10/2014 |
| WO | 2015059246 A1 | 4/2015 |
| WO | 2015059248 A1 | 4/2015 |
| WO | 2018149869 A1 | 8/2018 |
| WO | 2019170707 A1 | 9/2019 |

OTHER PUBLICATIONS

Chever, S., et al "High-protein fat-free acid milk gels: Control of protein composition and heat treatment," International Dairy Journal, vol. 37, No. 2, Feb. 19, 2014. pp. 95-103, XP09027959.
Lin et al: "Fortification of milk protein content with different dairy protein powders alters its compositional, rennet gelation, heat stability and ethanol stability characteristics," International Dairy Journal; vol. 61, Jul. 1, 2016, pp. 220-227.
Kessler, H.G., "Lebensmittelund Bioverfahrenstechnik, Molkkereitechnologie," (translated as Food and Organic Processing Technology, Dairy Technology), Verlag A. Kessler, Original Copyright 1996, 2nd reprint, 2011, pp. 165-166.
Wikipedia—Beta-Lactoglobulin—version Dec. 19, 2018—available at: https://en.wikipedia.org/w/index.php?title=Beta-lactoglobulin&oldid=87 443225.
Jorgensen, C. E., et al., "Improving the structure and rheology of high protein, low fat yoghurt with undenatured whey proteins", International Dairy Journal, 47 (2015), 6-18.
Karam, M. C. et al., (2013), Effect of dairy powders fortification on yogurt textural and sensorial properties: a review. Journal of Dairy Research 80, 400-409d11.
Wijayanti, H. B., et al., "Stability of Whey Proteins during Thermal Processing: A Review", Comprehensive Reviews in Food Science and Food Safety, vol. 13, 2014, 1235-1251.
U.S. Dairy Export Council, "Milk casein concentrates"—Print-out webpage: https://www.thinkusadairy.org/products/milk-proteins/milk-protein-categories/micellar-casein-concentrate.
Smith, K., "Dried Dairy Ingredients", Wisconsin Centre for Dairy Research, pp. 1, 20, and 42, 2008.
Sodini, I., et al., (2004). The Relative Effect of Milk Base, Starter, and Process on Yogurt Texture: A Review. Critical Reviews in Food Science and Nutrition, 44(2), 113-137.
Souci, Fachmann, Kraut, "Food Compositions and Nutrition Tables", 7th edition, MedPharm Scientific Publishers, 2008, pp. 23 and 54).
Soukoulis, C. et al., (2007). Industrial Yogurt Manufacture: Monitoring of Fermentation Process and Improvement of Final Product Quality. Journal of Dairy Science, vol. 90, Issue 6, 2641-2654.
Thompson, A., et al., "Milk Proteins: from Expression to Food", Elsevier, 2009, pp. 458 to 464.
European Patent Office, Notice of Opposition for EP Patent No. 3937648, dated Sep. 17, 2024.
European Patent Office, Notice of Opposition for EP Patent No. 3937648, dated Sep. 25, 2024.
SPX Corporation, APV LeanCreme, Microparticulation of Whey Protein with SPX Flow Technology, White Paper, Nov. 4, 2012.
Sodini, I et al.—"The Relative Effect of Milk Base, Starter, and Process on Yogurt Texture: A Review", Food Science and Nutrition vol. 44, pp. 113-137 (2004).†

(Continued)

*Primary Examiner* — Vera Stulii
(74) *Attorney, Agent, or Firm* — Lisa Mueller; Casimir Jones SC

(57) ABSTRACT

The present invention relates to a new method of producing a viscous, high protein, acidified, dairy product. The invention furthermore relates to new high protein acidified dairy product, to new protein powder and uses of the protein powder.

20 Claims, 4 Drawing Sheets

(56) References Cited

OTHER PUBLICATIONS

Dairy Processing Handbook, Chapter 6—Bylund, G., and Tetra Pak Processing Systems AB "Building-blocks of dairy processing" Dairy Processing Handbook. Tetra Pak Processing Systems AB (1995) (available at ia904506.us.archive.org/10/items/DairyProcessingHandbookTetrapak/Dairy-Processing-Handbook-Tetrapak.pdf).†

Soukoulis, C. et al., Industrial Yogurt Manufacture: Monitoring of Fermentation Process and Improvement of Final Product Quality, Journal of Dairy Science, vol. 90, Issue 6, pp. 2641-2654 (2007).†

Gilbert, A. et al.—"Studying stirred yogurt microstructure using optical microscopy: How smoothing temperature and storage time affect microgel size related to syneresis", Journal of Dairy Science vol. 103, No. 3, pp. 2139-2152 (2020).†

† cited by third party

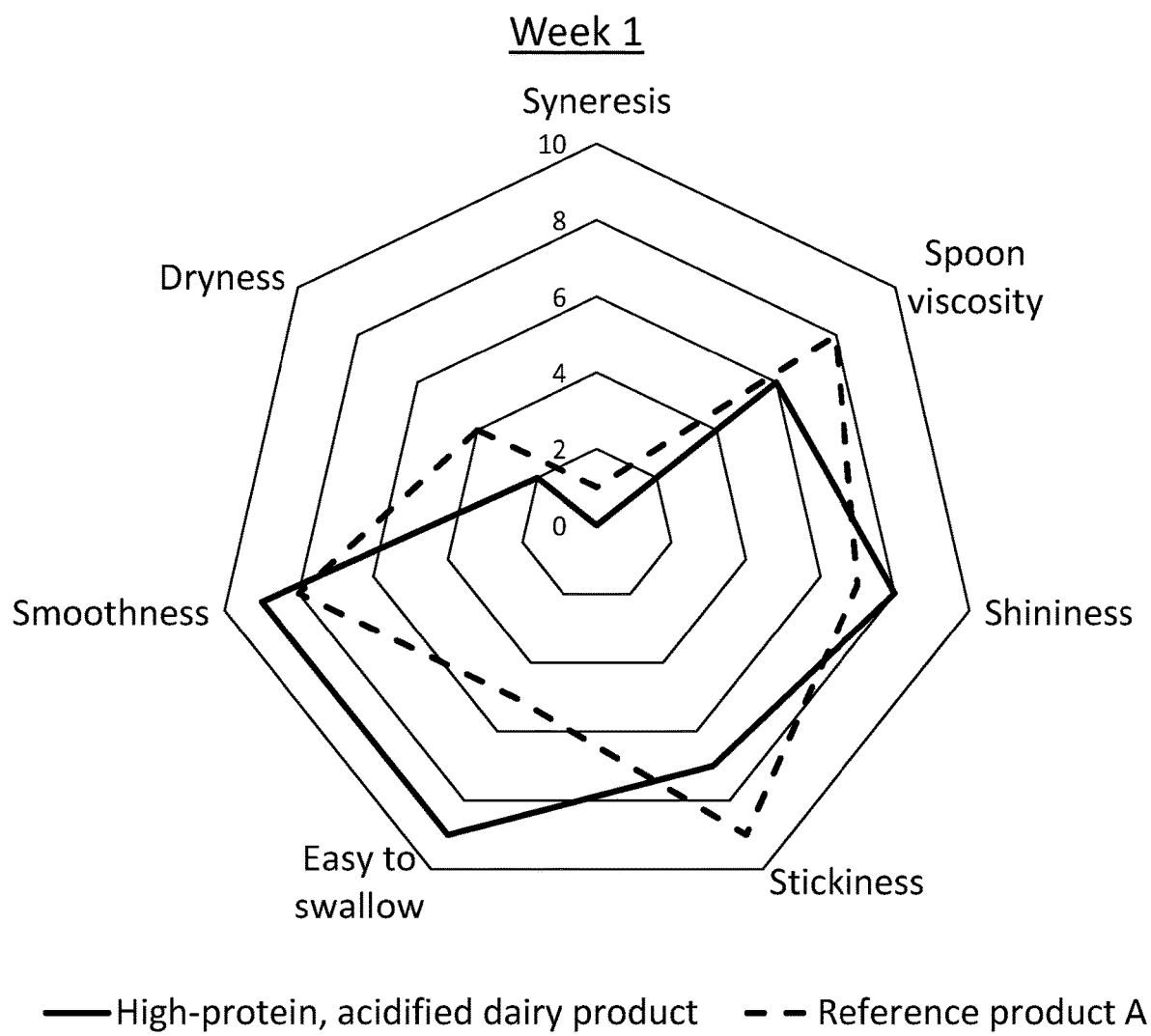

HIGH PROTEIN, ACIDIFIED, DAIRY PRODUCT, METHOD OF PRODUCING IT, PROTEIN POWDER AND USE THEREOF

FIELD OF THE INVENTION

The present invention relates to a new method of producing a high protein, acidified, dairy product and the products obtainable by the method. The invention furthermore relates to high protein acidified, dairy products, to protein powder and uses of the protein powder.

BACKGROUND

High protein acidified dairy products are very popular and are in demand in many markets worldwide. Production of high protein acidified dairy products requires special equipment, which may not be available in standard dairies or may be too expensive to acquire. Further, achieving a high protein acidified dairy product with good organoleptic properties and desired appearance can be challenging.

High protein acidified dairy products are traditionally produced by fermenting a milk with lactic acid bacteria. In order to increase the protein content of the acidified dairy product, water or whey can be drained after fermentation of the milk or alternatively protein can be added to the milk prior to fermentation.

US 2018/368430 A1 discloses a method for producing an acidified milk product comprising the steps of: providing a milk raw material; concentrating the milk raw material by membrane filtration to provide a filtration retentate; acidifying the filtration retentate with an acidic aqueous solution to provide an acidified filtration retentate having a pH in the range of about 5.2 to about 6.5, a calcium/protein ratio of at most about 0.03, and a phosphorous/protein ratio of at most about 0.025; processing the acidified filtration retentate to the acidified milk product having moisture on a fat-free basis of at least 70%.

US 2010/143538 A1 discloses a method for producing yoghurt. The method comprises (a) preparing a calcium-depleted milk composition comprising either (i) calcium-depleting a starting milk composition, or (ii) including within a starting milk composition a calcium-depleted milk ingredient selected from milk, fat standardised milk, skim milk, or milk concentrate; and (b) acidifying the calcium-depleted milk composition with chemical acidification or lactic acid producing bacteria, to prepare a yoghurt. The calcium depletion is obtained by contacting the milk composition or ingredient with a cation exchanger to replace calcium in the composition or ingredient with sodium or potassium.

International patent application WO 2010/120199 relates to preparation of whey protein concentrate (WPC) and use of the WPC as an ingredient in the manufacture of products like processed cheese and yoghurt.

US 2014/0308398 concerns methods of making protein-fortified yogurt products having a protein content of 10 wt % or more. The yoghurt is produced by mixing a casein-containing ingredient with the milk to obtain a casein-to-whey protein ratio of 82:18 or greater, fermenting the milk and thereby obtaining a yogurt mixture.

WO2015/059248A1 discloses a high protein, acidified dairy product, containing a denatured whey protein composition having a low content of soluble whey protein but a high total protein content.

SUMMARY OF THE INVENTION

The present invention pertains to a method of preparing a high protein, acidified dairy product comprising the steps of a) providing a liquid composition having a pH in the range of 5.5-8.0, which
   comprises a total amount of protein of in the range of 8-15% w/w,
   comprises a total amount of micellar casein of at least 60% w/w based on the total amount of protein,
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) optionally, smoothening the acidified dairy composition, and
e) optionally, packaging the acidified dairy product comprising, or even consisting of, the acidified dairy composition of step c) or step d).

Another aspect of the invention concerns a high protein, acidified, dairy product, e.g. obtainable by the present method, said high protein, acidified, dairy product comprising:
   a total amount of protein of in the range of 8-15% w/w.

Yet another aspect of the invention concerns a high protein, acidified, dairy product, e.g. obtainable by the present method, said high protein, acidified, dairy product comprising:
   a total amount of protein of in the range of 8-15% w/w, and
   a total amount of micellar casein of at least 60% w/w based on the total amount of protein.

An additional aspect of the invention pertains to a protein powder comprising
   a water content of at most 7% w/w,
   a total amount of protein of at least 50% w/w, and
   a total amount of micellar casein of at least 50% w/w based on the total amount of protein.

Another aspect of the invention pertains to a method of preparing a high protein, acidified dairy product comprising the steps of
a) providing a liquid composition having a pH in the range of 5.5-8.0, which comprises
   a total amount of protein of in the range of 8-15% w/w,
   a total amount of micellar casein of in the range of 60-80% w/w based on total protein
   a total amount of insoluble particles of denatured whey protein in the range of 5-18% w/w total protein
   a total amount of non-denatured beta-lactoglobulin (BLG) in the range of 1-15% w/w total protein, and
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) optionally, smoothening the acidified dairy composition, and
e) optionally, packaging the acidified dairy product comprising, or even consisting of, the acidified dairy composition of step c) or step d).

Yet an aspect of the invention pertains to a high-protein, acidified dairy product obtainable by the method as described herein, said high-protein, acidified dairy product comprising a total amount of protein of in the range of 8-15% w/w, and having a volume weighted mean particle diameter, D[4,3], of at most 100 micron, and preferably at most 50 micron.

A further aspect of the invention pertains to a protein powder, which preferably is suitable for producing a high-protein, acidified dairy product having a viscosity of at least 3500 cP at 5 degrees C. at a shear rate of 50/s, said protein powder having:
- a water content of at most 7% w/w,
- a total amount of protein of at least 50% w/w, and
- a total amount of micellar casein of 60-80% w/w based on the total amount of protein,
- a total amount of insoluble particles of denatured whey protein in the range of 5-18 w/w total protein,
- a total amount of non-denatured beta-lactoglobulin (BLG) in the range of 1-15% w/w based on total protein,
- a volume weighted mean particle diameter, D[4,3], of at most 10 micron, and
- a weight ratio between the total amount protein and the sum of calcium and magnesium of at least 36.

Yet another aspect of the invention pertains to the use of the protein powder for producing a high protein, acidified dairy product having a viscosity of at least 3500 cP at 5 degrees C. and at a shear rate of 50/s.

BRIEF DESCRIPTION OF THE FIGURES

FIG. 3 shows the result of the sensory evaluation of the high protein, acidified dairy product compared with the reference product A after 1 week of storage.

DETAILED DESCRIPTION

Figure 1:
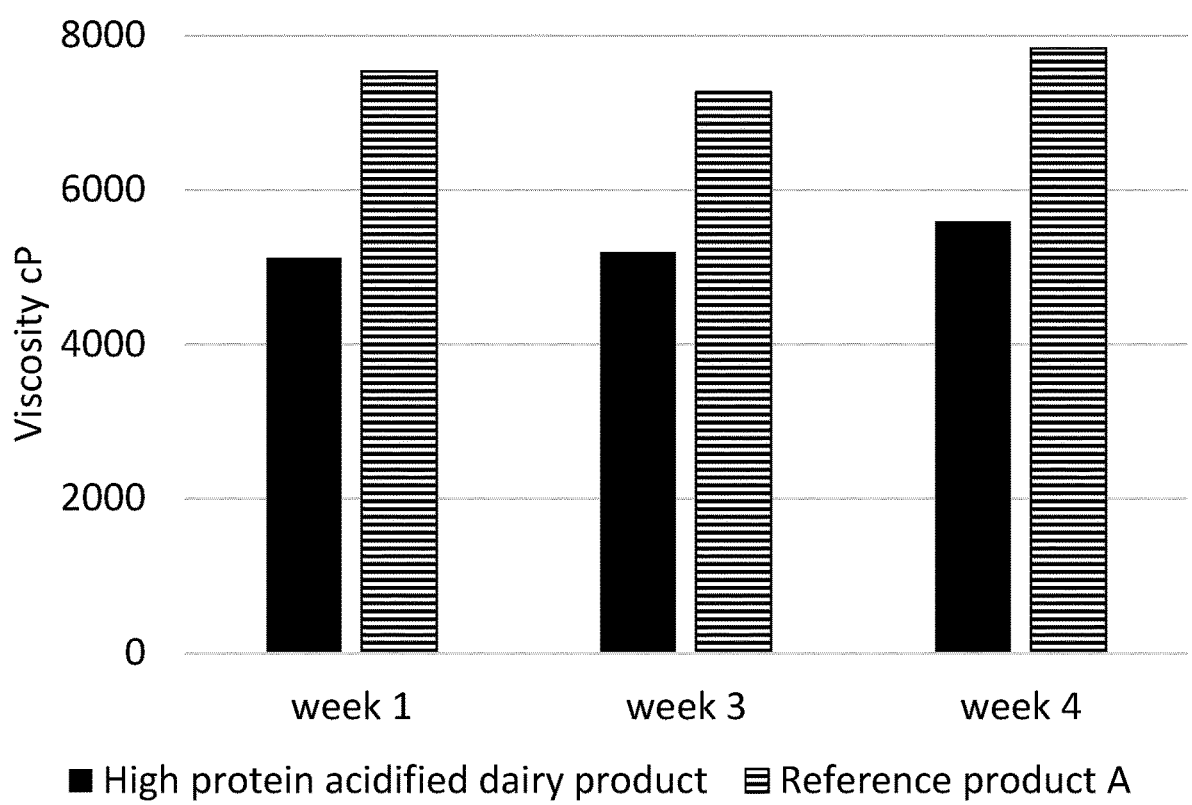
FIG. 1 shows the viscosity of the high protein, acidified dairy product and reference product A.

The present invention concerns in an aspect of the invention a method of preparing a high protein, acidified dairy product comprising the steps of
a) providing a liquid composition having a pH in the range of 5.5-8.0, which
    comprises a total amount of protein of in the range of 8-15% w/w,
    comprises a total amount of micellar casein of at least 60% w/w based on the total amount of protein,
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) optionally, smoothening the acidified dairy composition, and
e) optionally, packaging the acidified dairy product comprising, or even consisting of, the acidified dairy composition of step c) or step d).

Another aspect of the invention pertains to a method of preparing a high protein, acidified dairy product, the method comprising the steps of a) providing a liquid composition having a pH in the range of 5.5-8.0, which comprises
    a total amount of protein of in the range of 8-15% w/w,
    a total amount of micellar casein of in the range of 60-80% w/w based on total protein
    a total amount of insoluble particles of denatured whey protein in the range of 5-18% w/w total protein
    a total amount of non-denatured beta-lactoglobulin (BLG) in the range of 1-15% w/w total protein, and
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) optionally, smoothening the acidified dairy composition, and
e) optionally, packaging the acidified dairy product comprising, or even consisting of, the acidified dairy composition of step c) or step d).

A further aspect of the invention concerns a high protein, acidified dairy product obtainable by the inventive method.

Yet another aspect of the invention pertains to a high-protein, acidified dairy product obtainable by the method as described herein, said high-protein, acidified dairy product comprising a total amount of protein of in the range of 8-15% w/w, and having a volume weighted mean particle diameter, D[4,3], of at most 100 micron, and preferably at most 50 micron.

In the context of the present invention, the term "high protein" means that the composition or product in question contains a total amount of protein of at least 8% w/w.

In the context of the present invention, the term "acidic" or "acidified" means that the composition or product in question has a pH of at most 5.2 at 25 degrees C. The pH should be measured as shown in example 1.11.

In the context of the present invention, the term "liquid composition" pertains to a water-containing composition that is pourable and has a liquid appearance, but may contain dispersed particles and other solids in addition to water. The liquid composition preferably comprises water in an amount of at least 50% w/w.

In the context of the present invention, the term "micellar casein" or "casein micelles" pertains both to the native casein micelles found in mammal milk and to casein micelles isolated from milk. The isolated casein micelles still have micellar structure, however, the weight ratio between the individual casein species and/or the mineral content of the casein micelles may have been modified relative to native casein micelles.

The inventors have found that the content of minerals in the high protein, acidified dairy product influences the taste of the product, especially the content of calcium and magnesium impacts the overall taste and sensory properties of the product.

Thus, in a preferred embodiment of the invention the liquid composition contains a total amount of calcium and magnesium of at most 0.30% w/w. In a more preferred embodiment of the invention the liquid composition contains a total amount of calcium and magnesium of at most 0.28% w/w, more preferably at most 0.26% w/w, more preferably at most 0.24% w/w, more preferably at most 0.22% w/w, even more preferably at most 0.20% w/w, most preferably at most 0.18% w/w.

In a preferred embodiment of the invention, the liquid composition contains a total amount of calcium and magnesium in the range of 0.05-0.3% w/w. In a more preferred embodiment of the invention, the liquid composition contains a total amount of calcium and magnesium in the range of 0.1-0.28% w/w, more preferably in the range of 0.1-0.26% w/w, more preferably in the range of 0.1-0.24% w/w, more preferably in the range of 0.1-0.22% w/w, even more preferably in the range of 0.1-0.20% w/w, most preferably in the range of 0.1-0.18% w/w.

Calcium and magnesium may be present in the liquid composition in both dissolved form, e.g. in the form of $Ca^{2+}$ and $Mg^{2+}$, and non-dissolved form, e.g. forming part of water-insoluble salts such as calcium and magnesium phosphates inside the casein micelles. However, once the liquid composition is acidified an increasing amount of the calcium and magnesium will be in the form of free or complexed $Ca^{2+}$ and $Mg^{2+}$ ions.

In a preferred embodiment of the invention, the liquid composition has a weight ratio between protein and the sum of Ca and Mg of at least 32, preferably of at least 33, more preferably of at least 34, and even more preferably of at least 36. Even higher weight ratios may be preferred, thus, the liquid composition may preferably have a weight ratio between protein and the sum of Ca and Mg of at least 40, more preferably of at least 45, and even more preferred of at least 50.

In a preferred embodiment of the invention, the liquid composition has a weight ratio between protein and the sum of Ca and Mg in the range of 32 to 100, preferably in the range of 33-75, more preferably in the range of 33-50, and even more preferably in the range of 33-45. In a most preferred embodiment of the invention, the liquid composition has a weight ratio between protein and the sum of Ca and Mg in the range of 33-40.

In other preferred embodiments of the invention, the liquid composition has a weight ratio between protein and the sum of Ca and Mg in the range of 34 to 100, preferably in the range of 35-90, more preferably in the range of 40-80, and even more preferably in the range of 45-70. In a most preferred embodiment of the invention, the liquid composition has a weight ratio between protein and the sum of Ca and Mg in the range of 50-60.

Thus, in a preferred embodiment of the invention, the method of preparing a high protein, acidified dairy product comprises the steps of
a) providing a liquid composition having a pH in the range of 5.5-8.0, which
   comprises a total amount of protein of in the range of 8-15% w/w
   comprises a total amount of micellar casein of at least 60% w/w based on total protein
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) optionally, smoothening the acidified dairy composition, and
e) optionally, packaging the acidified dairy product comprising, or even consisting of, the acidified dairy composition of step c) or step d),
wherein the liquid composition contains a total amount of calcium and magnesium of at most 0.30% w/w and/or the liquid composition has a weight ratio between protein and the sum of Ca and Mg of at least 32.

In a more preferred embodiment of the invention, the method of preparing a high protein, acidified dairy product comprises the steps of
a) providing a liquid composition having a pH in the range of 5.5-8.0, which
   comprises a total amount of protein of in the range of 8-15% w/w
   comprises a total amount of micellar casein of at least 60% w/w based on total protein
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) optionally, smoothening the acidified dairy composition, and
e) optionally, packaging the acidified dairy product comprising, or even consisting of, the acidified dairy composition of step c) or step d),
wherein the liquid composition contains a total amount of calcium and magnesium of at most 0.28% w/w and/or the liquid composition has a weight ratio between protein and the sum of Ca and Mg in the range of 33-40.

In a preferred embodiment of the invention, a high protein, acidified dairy product obtainable by the inventive method is provided.

In a more preferred embodiment of the invention, the method of preparing a high protein, acidified dairy product comprises the steps of
a) providing a liquid composition having a pH in the range of 5.5-8.0, which
   comprises a total amount of protein of in the range of 8-15% w/w
   comprises a total amount of micellar casein of at least 60% w/w based on total protein
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) smoothening the acidified dairy composition, and
e) packaging the acidified dairy product comprising, or even consisting of, the acidified dairy composition of step c) or step d),
wherein the liquid composition contains a total amount of calcium and magnesium of at most 0.28% w/w and/or the liquid composition has a weight ratio between protein and the sum of Ca and Mg in the range of 33-40.

Calcium is often present in the liquid composition in larger amounts than magnesium. The weight ratio between Ca and Mg may e.g. be in the range of 1-1000, preferably in the range of 10-100.

Alternatively, magnesium may be present in the liquid composition in larger amounts than calcium. Thus, the weight ratio between Ca and Mg may e.g. be in the range of 0.001-1, preferably in the range of 0.01-0.1.

The liquid composition may furthermore contain other divalent metal cations, such as e.g. iron, zinc, manganese, copper, or combinations thereof. However, these are typically present in much lower concentrations than at least calcium and typically also in much lower concentrations than magnesium. It is therefore not necessary to consider other divalent metal cations than calcium and magnesium when calculating the weight ratio between protein and the total amount of Ca and Mg.

In a more preferred embodiment of the invention, the method of preparing a high protein, acidified dairy product comprises the steps of
  a) providing a liquid composition having a pH in the range of 5.5-8.0, which
    comprises a total amount of protein of in the range of 8-15% w/w
    comprises a total amount of micellar casein of at least 60% w/w based on total protein
  b) heating the liquid composition of step a) to a temperature of at least 70 degrees C. for a duration of time sufficient to obtain at least partial microbial reduction,
  c) subjecting the heat-treated, liquid composition of step b) to at least one acidification step using an acidifying agent, thereby obtaining an acidified dairy composition,
  d) smoothening the acidified dairy composition, and
  e) packaging the acidified dairy product comprising, or even consisting of, the acidified dairy composition of step c) or step d),
  wherein the high protein, acidified dairy product has a viscosity of at least 3500 cP at 5 degrees C. at a shear rate of 50/s as measured by example 1.3.

In a preferred embodiment of the invention, a high protein, acidified dairy product is provided having a viscosity of at least 3500 cP at 5 degrees C. at a shear rate of 50/s as measured by example 1.3, which product e.g. is obtainable by the inventive method.

In some embodiments of the invention, the liquid composition may comprise insoluble particles of denatured whey protein.

In a preferred embodiment of the invention, the liquid composition comprises a total amount of protein of in the range of 8-15% w/w, a total amount of micellar casein of in the range of 60-80% w/w based on the total amount of protein and comprises a total amount of insoluble particles of denatured whey protein in the range of 1-15% w/w, preferably 5-15% w/w based on the total amount of protein.

In some embodiments of the invention, the liquid composition may comprise native beta-lactoglobulin (BLG).

In a preferred embodiment of the invention, the liquid composition comprises a total amount of protein of in the range of 8-15% w/w, a total amount of micellar casein of in the range of 60-80% w/w based on the total amount of protein, a total amount of insoluble particles of denatured whey protein in the range of 1-15% w/w, preferably 5-15% w/w based on the total amount of protein and comprises a total amount of native beta-lactoglobulin (BLG) in the range of 1-15% w/w based on the total amount of protein.

In another preferred embodiment of the invention, the liquid composition comprises a total amount of protein of in the range of 8-15% w/w, a total amount of micellar casein of in the range of 60-80% w/w based on the total amount of protein, a total amount of insoluble particles of denatured whey protein in the range of 5-18% w/w, preferably 10-15% w/w based on the total amount of protein, and comprises a total amount of native beta-lactoglobulin (BLG) in the range of 1-15% w/w based on the total amount of protein.

In a preferred embodiment of the invention, the liquid composition comprises:
  a total amount of protein of in the range of 8-15% w/w
  a total amount of micellar casein of in the range of 60-80% w/w based on total protein
  a total amount of insoluble particles of denatured whey protein in the range of 1-15% w/w, preferably 5-15% w/w based on total protein
  a total amount of native beta-lactoglobulin (BLG) in the range of 1-15% w/w based on total protein,
wherein the liquid composition optionally has a volume weighted mean particle diameter, D[4,3], of at most 50 micron, and even more preferably of at most 25 micron.

In another preferred embodiment of the invention, the liquid composition comprises:
  a total amount of protein of in the range of 8-15% w/w
  a total amount of micellar casein of in the range of 60-80% w/w total protein)
  a total amount of insoluble particles of denatured whey protein in the range of 5-18% w/w, preferably 10-15% w/w based on total protein
  a total amount of native beta-lactoglobulin (BLG) in the range of 1-15% w/w based on total protein,
wherein the liquid composition optionally has a volume weighted mean particle diameter, D[4,3], of at most 50 micron, and even more preferably of at most 25 micron.

The present inventors have found that this embodiment is particularly suitable for producing viscous, skyr-like, high protein, acidified dairy products using a slot filter for smoothening the acidified product, and have found that high protein, acidified dairy products based on liquid compositions that do not contain insoluble particles of denatured whey protein seem to clog up the slot filter. Many yoghurt production lines are based on slot filter smoothening of the acidified dairy product and the present invention therefore makes it possible to produce a new product type on these production lines. A slot filter is essentially a material with fine pores through which a yoghurt can be pressed to smoothen the yoghurt product. A slot filter may e.g. be a mesh made of stainless steel or similar materials suitable for food production or a stainless steele plate with fine holess.

In an even more preferred embodiment of the invention, the liquid composition comprises:
  a total amount of protein of in the range of 9-12% w/w
  a total amount of micellar casein of in the range of 65-75% w/w based on total protein total protein
  a total amount of insoluble particles of denatured whey protein in the range of 8-12% w/w based on total protein
  a total amount of native beta-lactoglobulin (BLG) in the range of 9-12% w/w based on total protein,
wherein the liquid composition has a volume weighted mean particle diameter, D[4,3], of at most 10 micron, and even more preferably of at most 5 micron.

In some embodiments of the invention, the liquid composition has a volume weighted mean particle diameter of at most 50 micron. Preferably, the liquid composition has a volume weighted mean particle diameter of at most 40 micron. More preferably, the liquid composition has a volume weighted mean particle diameter of at most 20 micron. Even more preferably, the liquid composition has a volume weighted mean particle diameter of at most 15 micron. More preferably, the liquid composition has a volume weighted mean particle diameter of at most 10 micron. Even more preferably, the liquid composition has a volume weighted mean particle diameter of at most 5 micron. More preferably, the liquid composition has a volume weighted mean particle diameter of at most 1 micron.

In some embodiments of the invention, the liquid composition has a volume weighted mean particle diameter in the range of 0.2-50 micron. More preferably, the liquid composition has a volume weighted mean particle diameter in the range of 0.2-40 micron. More preferably, the liquid composition has a volume weighted mean particle diameter in the range of 0.3-20 micron. Even more preferably, the liquid composition has a volume weighted mean particle diameter in the range of 0.3-10 micron. Most preferably, the liquid composition has a volume weighted mean particle diameter in the range of 0.3-5 micron.

In some embodiments of the invention, the liquid composition has a volume weighted mean particle diameter in the range of 0.1-10 micron. More preferably, the liquid composition has a volume weighted mean particle diameter in the range of 0.1-5 micron. More preferably, the liquid composition has a volume weighted mean particle diameter in the range of 0.2-1 micron. Even more preferably, the liquid composition has a volume weighted mean particle diameter in the range of 0.2-0.5 micron.

In a preferred embodiment of the invention, the liquid composition comprises a total amount of protein of in the range of 8-15% w/w, a total amount of micellar casein of in the range of 60-80% w/w based on the total amount of protein, a total amount of insoluble particles of denatured whey protein in the range of 1-15% w/w, preferably 5-15% w/w based on the total amount of protein and comprises a total amount of native beta-lactoglobulin (BLG) in the range of 1-15% w/w based on the total amount of protein, and has a volume weighted mean particle diameter, D[4,3], of at most 100 micron, preferably at most 75 micron or even more preferably at most 50 micron.

In the context of the present invention, the term "whey protein" relates to the proteins which are present in the serum phase of either milk or coagulated milk. The proteins of the serum phase of milk are also sometimes referred to as milk serum proteins or ideal whey proteins. When used herein, the term "whey protein" encompasses both the native whey proteins and whey protein in denatured and/or aggregated form. The term whey protein may both encompass the protein of whey or milk serum in their normal concentration ranges relative to total protein, or preparations wherein one or more of the proteins have been enriched relative to the other proteins.

In the context of the present invention, the term "whey" relates to the liquid composition, which is left when casein has been removed from milk.

Casein may e.g. be removed by microfiltration providing a liquid permeate which is free of, or essentially free of, micellar casein, but contains the native whey proteins. This liquid permeate is sometimes referred to as ideal whey, serum or milk serum.

Alternatively, the casein may be removed from milk by contacting a milk composition with rennet enzyme, which cleavages kappa-casein into para-kappa-casein and the peptide caseinomacropeptide (CMP), thereby destabilising the casein micelles and causing casein to precipitate. The liquid surrounding the rennet-precipitated casein is often referred to as sweet whey and contains CMP in addition to the whey proteins, which are normally found in milk.

Casein may also be removed from milk by acid precipitation, i.e. reducing the pH of the milk below pH 4.6, which is the isoelectric point of casein and which causes the casein micelles to disintegrate and precipitate. The liquid surrounding the acid precipitated casein is often referred to as acid whey or casein whey and is substantially free of CMP.

In the context of the present invention, the terms "native alpha-lactalbumin", "native beta-lactoglobulin", "native CMP", "soluble alpha-lactalbumin", "soluble beta-lactoglobulin" or "soluble CMP" pertain to soluble, non-denatured alpha-lactalbumin, beta-lactoglobulin or CMP which preferably have approximately the same retention time as the standard of alpha-lactalbumin, beta-lactoglobulin or CMP when assayed according to Example 1.2.

The proteins used in the present invention are preferably proteins derived from mammalian milk, such as e.g. milk from human, cow, sheep, goat, buffalo, camel, llama, horse and/or deer. In some preferred embodiments of the invention, the proteins are bovine milk proteins including bovine casein and bovine whey protein.

In the context of the present invention, the term "insoluble particles of denatured whey protein" pertains to small particles of aggregated, denatured whey protein. The insoluble particles of denatured whey protein preferably have a volume weighted mean particle diameter in the range of 0.4-10 micron. The insoluble particles of denatured whey protein can be separated from soluble protein by centrifugation at 15000 g for 5 min. The insoluble particles of denatured whey protein are typically produced by heating a solution of whey protein at an appropriate pH (e.g. pH 5.5-8.0) while subjecting the solution to a high degree of shear. The shear may be provided by mechanical shearing, using e.g. scraped-surface heat exchangers or homogenizers or by subjecting the solution to high linear flow rates which promote turbulence.

It is also possible to prepare the denatured whey protein compositions using low shear or non-shear particulation methods. Such methods typically involve the use of relatively low concentrations of whey protein during heat treatment and precise control of the pH and the concentration of calcium.

The amount (% w/w relative to the total amount of protein) of insoluble particles of denatured whey protein is determined according to Example 1.1.

The terms "particle size" and "volume weighted mean particle diameter", when used herein, refer to the volume weighted mean particle diameter, D[4,3]. The volume weighted mean particle diameter is measured according to Example 1.1.

In the context of the present invention, the term "total protein" pertains to the total amount of true protein of a composition or product and disregards non-protein nitrogen (NPN). Total protein is measured according to example 1.4. The terms "total amount of protein", "total protein" and similar terms are used interchangeable to describe the total protein content of a given composition.

In the context of the present invention, the "weight ratio" w/w between two components A and B is determined as the weight of component A divided by the weight of component B. Thus, if a composition contains 9% w/w A and 6% w/w B, the weight ratio would be 9%/6%=1.5.

In the context of the present invention, the phrase "Y and/or X" means "Y or X" or "Y and X". Along the same line of logic, the phrase "$n_1$, $n_2$, . . . , $n_{i-1}$, and/or $n_i$" means "$n_1$" or "$n_2$" or . . . or "$n_{i-1}$" or "$n_i$" or any combination of the components: $n_1$, $n_2$, . . . $n_{i-1}$, and $n_i$, where i is an integer.

The insoluble particles of denatured whey protein may be produced by heat-denaturation of dissolved whey protein at concentrations in the range of 1-30% w/w. If the whey protein concentration is higher than approx. 5% w/w, high shear levels are used during and/or after the denaturation to avoid formation of too large particles.

More details regarding the production of insoluble particles of denatured whey protein and sources containing them are found in U.S. Pat. No. 6,605,311, WO 2008/063, 115, DE 19950240 A1, DE102012216990 A1, WO 2010/

120199, WO 2007/110411 and WO2015/059248 A1, which all are incorporated herein by reference.

In some preferred embodiments of the invention, the source of insoluble particles of denatured whey protein is a denatured whey protein product prepared by subjecting a solution comprising soluble whey protein in an amount of 1-30% w/w and having a pH in the range of pH 5-8 to a temperature of at least 70 degrees C. for a duration sufficient to obtain at least 30% w/w insoluble particles of denatured whey protein relative to the total amount of whey protein. The denatured whey protein product may optionally be converted to a powder.

The solution comprising soluble whey protein preferably contains at least 50% protein relative to total solids. More preferably, the solution comprising soluble whey protein contains at least 60% protein relative to total solids. Even more preferably, the solution comprising soluble whey protein contains at least 70% protein relative to total solids. More preferably, the solution comprising soluble whey protein contains at least 80% protein relative to total solids. More preferably, the solution comprising soluble whey protein contains at least 90% protein relative to total solids, and, even more preferably, the solution comprising soluble whey protein contains about 100% protein relative to total solids.

In some preferred embodiments of the invention, the total amount of protein of the liquid composition is at least 8% w/w. In other preferred embodiments of the invention, the total amount of protein of the liquid composition is at least 8.5% w/w. Preferably, the total amount of protein of the liquid composition is at least 9% w/w. More preferably, the total amount of protein of the liquid composition is at least 10%. Most preferably, the total amount of protein of the liquid composition is at least 12% w/w.

For example, the total amount of protein may be in the range of 8-15% w/w. Preferably, the total amount of protein may be in the range of 8.5-14% w/w. More preferably, the total amount of protein may be in the range of 9-13% w/w. Even more preferably, the total amount of protein may be in the range of 10-12% w/w.

In some preferred embodiments of the invention, the total amount of protein of the liquid composition comprises whey protein in the range of 0-40% w/w based on the total amount of protein. Preferably, the total amount of protein comprises whey protein in the range of 20-40% w/w based on the total amount of protein. More preferably, the total amount of protein comprises whey protein in the range of 25-35% w/w based on the total amount of protein. Most preferably, the total amount of protein comprises whey protein in the range of 28-32% w/w based on the total amount of protein, such as in the range of 30-31% w/w based on the total amount of protein.

In some preferred embodiments of the invention, the liquid composition comprises whey protein in the range of 0-40% w/w. Preferably, the liquid composition comprises whey protein in the range of 0-30% w/w. More preferably, the liquid composition comprises whey protein in the range of 0-20% w/w. Most preferably, the liquid composition comprises whey protein in the range of 0-10% w/w, such as in the range of 0-5% w/w.

In some preferred embodiments of the invention, the total amount of insoluble particles of denatured whey protein of the liquid composition is in the range of 1-15% w/w, preferably 5-15% w/w, more preferably in the range of 5-13% w/w, even more preferably 8-12% w/w, even most preferably 9-11% w/w.

In other preferred embodiments of the invention, the total amount of insoluble particles of denatured whey protein of the liquid composition is in the range of 5-18% w/w, more preferably 5-15% w/w, even more preferably in the range of 5-13% w/w, even more preferably 8-12% w/w, and most preferably 9-11% w/w.

In some preferred embodiments of the invention, the liquid composition comprises native BLG in an amount of at most 15% w/w based on the total amount of protein. Preferably, the liquid composition comprises native BLG in an amount of at most 13% w/w based on the total amount of protein. More preferably, the liquid composition comprises native BLG in an amount of at most 12% w/w based on the total amount of protein. Even more preferably, the liquid composition comprises native BLG in an amount of at most 8% w/w based on the total amount of protein.

In some preferred embodiments of the invention, the liquid composition comprises native BLG in an amount of 1-15% w/w based on the total amount of protein. More preferably, the liquid composition comprises native BLG in an amount of 5-13% w/w based on the total amount of protein. Even more preferably, the liquid composition comprises native BLG in an amount of 6-12% w/w based on the total amount of protein. Most preferably, the liquid composition comprises native BLG in an amount of 7-11% w/w based on the total amount of protein.

In some preferred embodiments of the invention, the total amount of protein of the liquid composition comprises at least 60% w/w micellar casein. More preferably, the total amount of protein of the liquid composition comprises at least 65% w/w micellar casein. More preferably, the total amount of protein of the liquid composition comprises at least 68% w/w micellar casein and most preferably at least 69% w/w micellar casein.

In some preferred embodiments of the invention, the total amount of protein of the liquid composition comprises at least 60% w/w micellar casein. More preferably, the total amount of protein of the liquid composition comprises at least 65% w/w micellar casein. More preferably, the total amount of protein of the liquid composition comprises at least 68% w/w micellar casein and most preferably at least 69% w/w micellar casein.

Even higher concentrations of micellar casein may be useful, and, in some preferred embodiments of the invention, the total amount of protein of the liquid composition comprises at least 75% w/w micellar casein. More preferably, the total amount of protein of the liquid composition comprises at least 85% w/w micellar casein. More preferably, the total amount of protein of the liquid composition comprises at least 90% w/w micellar casein and most preferably at least 95% w/w micellar casein.

The amount of micellar casein of the liquid composition (or of the protein powder) is easily determined by performing step 1)-5) of Example 1.1-I, and measuring the protein lost from the supernatant of step 5) when it is heated to 35 degrees C., held at that temperature of 1 hour, and subjected to centrifugation at 100000 g for 1 hour at 35 degrees C. Micellar casein sediments by this treatment but not at 15000 g for 5 minutes and the loss of protein from the supernatant due to the centrifugation at 100000 g corresponds to the concentration of micellar casein.

In some preferred embodiments of the invention, the total amount of protein of the liquid composition comprises in the range of 60-80% of micellar casein, more preferably 65-75% w/w, even more preferably 68-72% w/w and most preferably at in the range of 69-70% w/w.

In a preferred embodiment of the invention, the liquid composition comprises a total amount of protein of in the range of 8-15% w/w and comprises a total amount of micellar casein of in the range of 60-80% w/w based on the total amount of protein. In a more preferred embodiment of the invention, the liquid composition comprises a total amount of protein of in the range of 8-15% w/w and comprises a total amount of micellar casein of in the range of 65-75% w/w based on the total amount of protein.

In some embodiments of the invention, the liquid composition of step a) comprises 0.5-5% w/w caseinomacropeptide (CMP) based on the total amount of protein, and preferably 0.5-2% w/w or even more preferred 1-1.5% w/w.

The liquid composition may furthermore contain other ingredients such as lipids, carbohydrates, vitamins and sweeteners, carbohydrate based stabilizers and/or emulsifiers.

Alternatively or additionally, such other ingredients may be added after step c) and preferably after step d).

In some preferred embodiments of the invention, the liquid composition of step a) furthermore comprises lipid. In some embodiments, the lipid comprises milk lipid and/or vegetable lipid. For example, the liquid composition may comprise one or more milk lipid sources, e.g. selected from the group consisting of cream, butter, butter fat, anhydrous milk fat, whey fat, and combinations thereof.

In a preferred embodiment, the lipid source comprises or even consists essentially of cream.

In some embodiments of the invention, at least 50% w/w of the lipid is in the form of milk fat globules. Preferably, at least 70% w/w of the lipid is in the form of milk fat globules. More preferably, at least 80% w/w of the lipid is in the form of milk fat globules. Even more preferably, at least 90% w/w of the lipid is in the form of milk fat globules.

Sources of insoluble particles of denatured whey protein may also contain milk lipid, e.g. in the range of 0.1-9% w/w relative to total solids. The source of insoluble particles of denatured whey protein may e.g. contain milk lipid, e.g. in the range of 1-6% w/w relative to total solids.

The vegetable lipid may comprise, or even consist of, a vegetable fat.

The vegetable fat may comprise one or more fat(s) selected from the group consisting of rapeseed oil, sunflower oil, olive oil, palm fat, palm kernel fat, and coconut fat, and a combination thereof.

Additionally, hydrogenated versions of the above-mentioned vegetable oils may also be useful as vegetable fats.

In a preferred embodiment, the liquid composition of step a) comprises lipid in an amount of at most 3.5% w/w. Preferably, the liquid composition of step a) comprises lipid in an amount of at most 2% w/w. Even more preferably, the liquid composition of step a) comprises lipid in an amount of at most 1% w/w.

In a preferred embodiment, the liquid composition of step a) comprises lipid in an amount of 0.5-3.5% w/w. Preferably, the liquid composition of step a) comprises lipid in an amount of 1.0-3.0% w/w. Even more preferably, the liquid composition of step a) comprises lipid in an amount of 1.5-2.5% w/w.

In a preferred embodiment, the liquid composition of step a) comprises lipid in an amount of at least 4% w/w. Preferably, the liquid composition of step a) comprises lipid in an amount of at least 7% w/w. Even more preferably, the liquid composition of step a) comprises lipid in an amount of at least 10% w/w and even more preferably, the liquid composition of step a) comprises lipid in an amount of at least 11% w/w.

For example, the liquid composition of step a) comprises lipid in an amount in the range of 0.1-20% w/w. In an embodiment, the liquid composition of step a) comprises lipid in an amount in the range of 4-18% w/w. In another embodiment, the liquid composition of step a) comprises lipid in an amount in the range of 6-15% w/w. In a preferred embodiment, the liquid composition of step a) comprises lipid in an amount in the range of 8-12% w/w. Most preferably, the liquid composition of step a) comprises lipid in an amount in the range of 10-11% w/w.

The liquid composition of step a) may furthermore comprise carbohydrate. The carbohydrate may e.g. comprise di- and/or mono-saccharide.

The carbohydrate normally comprises or even consists of sucrose, maltose, lactose, dextrose, glucose, fructose, galactose or a combination thereof.

In some preferred embodiments of the invention, the liquid composition contains a total amount of carbohydrate of at least 5% w/w. Preferably, the liquid composition contains a total amount of carbohydrate of at least 7% w/w, and even more preferably, the liquid composition contains a total amount of carbohydrate of at least 10% w/w, even more preferably, the liquid composition contains a total amount of carbohydrate of at least 15% w/w. For example, the liquid composition may contain a total amount of carbohydrate of e.g. of at least 25% w/w.

In other preferred embodiments, the liquid composition contains a total amount of carbohydrates of 0-25% w/w. More preferably, the liquid composition contains a total amount of carbohydrates of 7-15% w/w.

In some embodiments of the invention, the liquid composition contains a total amount of carbohydrate of at most 4% w/w. Preferably, the liquid composition contains a total amount of carbohydrate of at most 3% w/w. Even more preferably, the liquid composition contains a total amount of carbohydrate of at most 2% w/w. Even more preferably, the liquid composition contains a total amount of carbohydrate of at most 0.5% w/w. Most preferably, the liquid composition contains a total amount of carbohydrate of at most 0.01% w/w.

The carbohydrate may e.g. comprise or even consist of lactose.

In some embodiments of the invention, the liquid composition contains a total amount of lactose of at most 4% w/w. Preferably, the liquid composition contains a total amount of lactose of at most 3% w/w. Even more preferably, the liquid composition contains a total amount of lactose of at most 2% w/w, and even more preferably, the liquid composition contains a total amount of lactose of at most 0.5% w/w.

In other preferred embodiments, the total amount of lactose is present in an amount of 0.5-10% w/w, e.g. such as 2-4% w/w.

Alternatively, the liquid composition is lactose-reduced (less than 1.0 g lactose per 100 g) or even lactose-free (less than 0.01 g lactose per 100 g).

The liquid composition may furthermore comprise a dietary fibre. The dietary fibre should preferably not contribute to the viscosity of the high protein dairy product. In a preferred embodiment of the invention, the dietary fibre is inulin, fructose oligosaccharide and/or galactose oligosaccharide.

The liquid composition may furthermore comprise one or more vitamin(s) such as vitamin A, vitamin D, vitamin E, vitamin K, thiamine, riboflavin, pyridoxine, vitamin B12, niacin, folic acid, pantothenic acid, biotin, vitamin C, choline, vitamin B8, their salts, their derivatives and combinations thereof.

The content of the one of more vitamins may e.g. be in the range of 0.01-1% w/w relative to the dry weight of the liquid composition, preferably in the range of 0.1 to 0.5% w/w.

In some preferred embodiments of the invention, the vitamin comprises or even consists essentially of vitamin D.

In some preferred embodiments, the liquid composition comprises vitamin D in an amount within the range of 0.5-2.5 microgram/100 ml, more preferably, the liquid composition comprises vitamin D in an amount within the range of 1.0-1.5 microgram/100 ml. Even more preferably, the liquid composition comprises vitamin D in an amount within the range of 1.1-1.3 microgram/100 ml, more preferably, the liquid composition comprises vitamin D in an amount within the range of 1.15-1.25 microgram/100 ml. In a preferred embodiment, the liquid composition comprises vitamin D in an amount of 1.2 microgram/100 ml.

In some embodiments of the invention, the liquid composition comprises both vitamin D and vitamin K.

The liquid composition of step a) typically comprises an amount of total solids in the range of 4-50% w/w. Preferably, the liquid composition of step a) comprises an amount of total solids in the range for example of 10-45% w/w. More preferably, the liquid composition of step a) comprises an amount of total solids in the range of 20-40% w/w. Even more preferably, the liquid composition of step a) comprises an amount of total solids in the range of 20-30% w/w. More preferably, the liquid composition of step a) comprises an amount of total solids in the range of 25-30% w/w.

The liquid composition of step a) may furthermore comprise additional ingredients, such as e.g. sweetener, carbohydrate stabilizers and emulsifiers alone or in combinations.

The liquid composition may furthermore contain one of more non-carbohydrate natural or artificial sweeteners.

In some embodiments, the liquid composition contains one or more natural sweetening agent(s) that are not sugars. These natural sweetening agent(s) may be provided as a component of a second sweetening agent, either alone, or in combination with a carbohydrate sweetener, as described. The natural non-carbohydrate sweetening agent(s) may for example be selected from the group consisting of *Momordica grosvenorii* (Mogrosides IV or V) extracts, Rooibos extracts, Honeybush extracts, Stevia extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose and/or natural polyols such as maltitol, mannitol, lactitol, sorbitol, inositol, xylitol, threitol, galactitol and combinations thereof.

In some embodiments, the liquid composition contains one or more artificial sweetening agent(s). These artificial sweetening agent(s) may be provided as a component of the first sweetener, either alone or in combination with other of the sweeteners as defined above. The artificial non-carbohydrate sweetening agent(s) may for example be selected from the group consisting of Aspartame, Cyclamate, Sucralose, Acesulfame K, neotame, Saccharin, Neohesperidin dihydrochalcone, Stevia extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR) and combinations thereof.

In some embodiments of the invention, it is particularly preferred that the sweetener comprises or even consists of one or more high intensity sweeteners (HIS). HIS are both found among the natural and artificial sweeteners and typically have a sweetening intensity of at least 10 times that of sucrose. Non-limiting examples of useful HIS are Aspartame, Cyclamate, Sucralose, Acesulfame K, neotame, Saccharin, Neohesperidin dihydrochalcone and combinations thereof.

In the context of the present invention the term "high intensity sweetener" pertains to a sweetener which provides a sweetness intensity (tested in water at 25 degrees C.) per g that is at least 10 times higher than that the sweetness intensity provided by sucrose.

If used, the total amount of HIS is typically in the range of 0.01-2% w/w. For example, the total amount of HIS may be in the range of 0.05-1.5% w/w. Alternatively, the total amount of HIS may be in the range of 0.1-1.0% w/w.

It may furthermore be preferred that the sweetener comprises or even consists of one or more polyol sweetener(s). Non-limiting examples of useful polyol sweetener are maltitol, mannitol, lactitol, sorbitol, inositol, xylitol, threitol, galactitol or combinations thereof.

If used, the total amount of polyol sweetener is typically in the range of 1-20% w/w. For example, the total amount of polyol sweetener may be in the range of 2-15% w/w. Alternatively, the total amount of polyol sweetener may be in the range of 4-10% w/w.

In a preferred embodiment of the invention, the liquid composition does not comprise non-carbohydrate natural or artificial sweetener.

In a preferred embodiment of the invention, the liquid composition comprises inulin and does not comprise non-carbohydrate natural or artificial sweetener.

The pH of liquid composition is preferably in the range of pH 5.5-8.0, more preferably in the range of pH 6.0-7.5, and even more preferably in the range of pH 6.0-6.5.

The liquid composition may be produced by mixing dairy ingredients that are well-known and available to the skilled person.

In some preferred embodiments of the invention, the liquid composition is provided by combining, and preferably mixing water and/or liquid milk with one or more of the following ingredients:
- a micellar casein concentrate,
- a milk powder
- a milk protein concentrate,
- a denatured whey protein product comprising insoluble particles of denatured whey protein,
- a whey protein concentrate or isolate containing non-denatured whey protein,
- a blend of any of the above ingredients, If the liquid composition should contain other ingredients, these are combined with the ingredients of the above-mentioned paragraph.

In the context of the present invention, the term "micellar casein concentrate" pertains to a liquid or powder in which the content of micellar casein is at least 40% w/w relative to total solids, preferably at least 70% w/w relative to total solids, and more preferably at least 80% w/w relative to total solids. A micellar casein concentrate contains at least 85% w/w micellar casein relative to total protein, preferably, at least 90% w/w micellar casein, and more preferably at least 95% w/w micellar casein. Production of micellar casein concentrate is typically performed by subjecting skim milk to microfiltration using a membrane pore size of 0.1-0.3 micron, optionally supplemented with diafiltration using a membrane having the same or a similar pore size, and collecting the microfiltration retentate as the micellar casein concentrate in liquid form. The micellar casein concentrate in liquid form may be converted to micellar casein concentrate in powder form, e.g. by spray-drying. The content of calcium and magnesium of the micellar casein concentrate may e.g. be reduced by performing the microfiltration or microfiltration/diafiltration at a pH in the range of 5.5-6.0 and/or in the presence of a calcium chelator, such as e.g. citrate.

In the context of the present invention, the term "milk powder" has its ordinary meaning and is preferably skim milk powder.

In the context of the present invention, the term "liquid milk" has its ordinary meaning and is preferably skim milk or whole milk. The term also encompasses low lactose or lactose-free liquid milk.

In the context of the present invention, the term "milk protein concentrate" has its ordinary meaning and pertains to a concentrate of the proteins of milk, but typically contains less lactose and mineral relative to total solids than skim milk. The milk protein concentrate may e.g. be in powder or liquid form. A milk protein concentrate is typically prepared by ultrafiltration of skim milk, optionally combined with diafiltration. The content of calcium and magnesium of the milk protein concentrate may e.g. be reduced by performing the ultrafiltration or ultrafiltration/diafiltration at a pH in the range of 5.5-6.0 and/or in the presence of a calcium chelator, such as e.g. citrate.

In the context of the present invention, the term "denatured whey protein product comprising insoluble particles of denatured whey protein" is a source of insoluble particles of denatured whey protein. The denatured whey protein product is preferably based on a whey protein concentrate or a whey protein isolate. Preferably, the denatured whey protein product comprises a total amount of whey protein of at least 70% w/w of which at least 50% w/w is in the form of insoluble particles of denatured whey protein. Even more preferably, the denatured whey protein product comprises a total amount of whey protein of at least 75% w/w of which at least 60% w/w is in the form of insoluble particles of denatured whey protein.

The denatured whey protein product preferably has a volume weighted mean particle diameter of at most 5 micron. Preferably, denatured whey protein product has a volume weighted mean particle diameter of at most 4 micron. More preferably, the denatured whey protein product preferably has a volume weighted mean particle diameter of at most 3 micron.

Even more preferably, the denatured whey protein product preferably has a volume weighted mean particle diameter of at most 2 micron. Most preferably, the denatured whey protein product preferably has a volume weighted mean particle diameter of at most 1 micron.

In the context of the present invention, the terms "whey protein concentrate" and "whey protein isolate" have their ordinary meanings and preferably contain substantially undenatured whey protein.

It is particularly preferred, that the liquid composition is provided by mixing a protein powder as described herein with a liquid milk and/or water and optionally processing the mixture by hydration and homogenisation. Such a protein powder preferably comprises a micellar casein concentrate and a denatured whey protein product comprising insoluble particles of denatured whey protein, and optionally other ingredients.

The present inventors have found that it is particularly preferred to prepare the liquid composition from ingredients that have a low content of calcium and magnesium to improve the taste of the acidified dairy product.

In a preferred embodiment, the mixture furthermore comprises a lipid source. In a preferred embodiment, the lipid source comprises or even consists essentially of cream. Preferably, the lipid source is present in the mixture in an amount in the range of 0.1-20% w/w. More preferably, the lipid source is present in the mixture in an amount in the range of 8-12% w/w.

In a preferred embodiment, the mixture furthermore comprises a carbohydrate source. In a preferred embodiment, the carbohydrate source is present in the mixture in an amount of 0-25% w/w. More preferably, the carbohydrate source is present in the mixture an amount in the range of 7-15% w/w.

The mixture may furthermore comprise additional ingredients, such as e.g. vitamins, sweetener, carbohydrate stabilizers, emulsifiers, fruits alone or in combinations.

The mixture can be used directly as the liquid composition. Alternatively, the mixture may be subjected to additional processing, such as e.g. hydration, preheating and/or homogenization.

The liquid composition may advantageously be prepared by mixing the ingredients with an appropriate amount of water or liquid milk and letting the components of the mixture hydrate of 0.2-24 hours, preferably 0.5-2 hours, and typically at a temperature in the range of 1-60 degrees C., e.g. at a temperature in the range 1-10 degrees C.

The liquid composition of step a) may for example be provided by preheating the hydrated mixture to a temperature in the range of 0-20 degrees C., preferably in the range of 0-10 degrees C. and then homogenising the mixture. The homogenisation step typically involves a total pressure drop of 100-1000 bar, preferably 200-300 bar, and may e.g. be performed in a single or twostep mode. Preferably, the homogenisation is performed in a two-stage mode with a pressure drop of 150-250 bar in the first stage and a pressure drop of 20-70 bar in the second stage.

Step b) involves subjecting the liquid composition to a heat treatment step. In a preferred embodiment of the invention, the liquid composition of step a) is heated to a temperature of at least 70 degrees C. for a duration of time sufficient to obtain at least partial microbial reduction.

In a preferred embodiment of the invention, the heat treatment of step b) comprises heating to a temperature of at least 70 degrees C. for a duration sufficient to obtain at least a 5-$\log_{10}$ reduction of viable *Escherichia coli*, i.e. 99.999% of the bacteria would die.

In some preferred embodiments of the invention, the heat treatment of step b) comprises heating to a temperature of at least 72 degrees C. for a duration sufficient to obtain at least a 5-$\log_{10}$ reduction of viable *Escherichia coli*, for example at least 15 seconds.

In other preferred embodiments of the invention, the heat treatment of step b) comprises heating to a temperature of at least 80 degrees C. for a duration sufficient to obtain at least a 5-$\log_{10}$ reduction of viable *Escherichia coli*, for example at least 5 minutes and preferably in the range of 5-20 minutes.

In a preferred embodiment of the invention, the temperature of the heat treatment of step b) is in the range of 80-95 degrees C. for duration of 5 to 15 minutes.

In some preferred embodiments of the invention, the heat-treatment of step b) is followed by cooling the liquid composition to a temperature of at most 50 degrees C. or the temperature at which the liquid composition is subjected to at least one acidification step.

In some preferred embodiments of the invention, the heat-treatment is followed immediately by a homogenization step of the heat-treated liquid composition.

In step c), the heat-treated liquid composition of step b) is subjected to at least one acidification step using an acidifying agent.

In a preferred embodiment of the invention, the acidifying agent is a bacterial culture, typically referred to as a starter culture, in which case the addition of the acidifying agent may be perceived as an inoculation of the cooled liquid composition, in which case one obtains an inoculated liquid composition.

Thus, in some embodiments of the invention, the acidifying agent comprises a chemical acidifying agent.

In the context of the present invention, the term "chemical acidifying agent" pertains to a chemical compound capable of gradual or instantaneous reduction of the pH of the mixture.

The chemical acidifying agent may for example be a food acceptable acid (also referred as a food acid) and/or a lactone. Examples of useful acids are carboxylic acids, such as citric acid, tartaric acid and/or acetic acid. An example of a useful lactone is glucono delta-lactone (GDL).

In some embodiments of the invention, the chemical acidifying agent comprises one or more components selected from the group consisting of acetic acid, lactic acid, malic acid, citric acid, phosphoric acid or glucono delta-lactone.

The amount of the added acidifying agent is typically relatively low compared to the amount of the liquid composition.

In some embodiments of the invention the acidifying agent dilutes the liquid composition by a factor of at most 1.05, preferably at most by a factor of 1.01, and even more preferably by a factor of at most 1.005.

The actual concentration of the chemical acidifying agent depends on the specific formulation of liquid composition. It is generally preferred that the chemical acidifying agent is used in a sufficient amount to reduce the pH of the mixture to at most pH 5.2, and preferably at most pH 5.0, such as e.g. at most pH 4.6.

In some embodiments of the invention, the chemical acidifying agent is used in a sufficient amount to reduce the pH to be in the range of 3.8-5.2. In a preferred embodiment of the invention, the chemical acidifying agent is used in a sufficient amount to reduce the pH to be in the range of 4.0-5.0. In a more preferred embodiment, the pH is reduced to be in the range of 4.2-4.7 or even more preferred in the range of 4.3-4.5, such as e.g. pH 4.4.

In some preferred embodiments of the invention, the acidifying agent comprises, or even is, a starter culture.

In principle, any type of starter culture traditionally used in making yoghurt-type or skyr-type acidified dairy product may be used. Starter cultures used in the dairy industry are normally mixtures of lactic acid bacterial strains, but a single strain starter culture may also be useful in the present invention. Thus, in preferred embodiments, the one or more starter culture organism of the present process is a lactic acid bacterial species selected from the group consisting of *Lactobacillus, Leuconostoc, Lactococcus, Streptococcus, Theremobacterium*. Commercial starter culture comprising one or more of these lactic acid bacterial species may be useful in the present invention.

In some preferred embodiments of the invention, the starter culture comprises one or more halotolerant bacterial culture(s).

It is generally preferred that when the acidifying agent is a bacterial fermentation, the pH of the liquid composition is reduced to at most pH 5.2, and preferably at most pH 5.0, such as e.g. at most pH 4.6.

In some embodiments of the invention, the liquid composition is fermented to reduce the pH to be in the range of 3.8-5.2. In a preferred embodiment of the invention, the liquid composition is fermented to reduce the pH to be in the range of 4.0-5.0. In a more preferred embodiment, the pH is reduced to be in the range of 4.2-4.7 or even more preferred in the range of 4.3-4.5, such as e.g. pH 4.4.

Flavouring and/or aromatic agents may be added to the liquid composition in step a) or alternatively during and/or after step c) to obtain a flavoured acidified dairy product. Flavours may be added as solids, but are preferably added in the form of liquids. However, it is often preferred that the flavours are added after the acidification.

Flavour may preferably be added in the form of a fruit preparation. A fruit preparation may e.g. be added in an amount of 2-30% w/w, e.g. of 5-25% w/w, such as 15-25% w/w e.g. approx. 20% w/w. The fruit of a fruit preparation may e.g. be selected from the group consisting of strawberry, raspberry, blueberry, apple, vanilla, rhubarb and combinations thereof.

In an alternative, yet also preferred, embodiment of the invention no non-dairy flavouring and/or aromatic agents are added to the acidified dairy composition.

During step c), the acidifying agent is allowed to reduce the pH of the heat-treated liquid composition of step b).

If the liquid composition is an inoculated liquid composition, it is incubated under conditions permitting the starter culture to become metabolically active to produce the acidified liquid composition. In some preferred embodiments, the inoculated liquid composition is incubated at a temperature between 25 degrees C. and 43 degrees C., preferably between 36 and 42 degrees C. until the desired pH is reached. The fermentation may be stopped by decreasing the temperature to around 10 degrees C.

If the liquid composition contains a chemical acidifying agent, the chemical acidifying agent will normally start reducing the pH of the mixture as soon as the chemical acidifying agent forms part of the mixture. Some chemical acidifying agents, such as lactones and slowly dissolving acids, will provide a gradual pH reduction as they react with water or are dissolved.

The temperature of the liquid composition during step c) is typically in the range of 20-50 degrees C., and preferably in the range of 32-45 degrees C.

Step d) involves smoothening the acidified liquid composition and is optional. Thus, in some preferred embodiments of the invention, the method comprises step d). In other preferred embodiments of the invention, the method does not comprise step d).

Smoothening is a well-known process in the art of dairy technology and may be performed as a back-pressure homogenization, by use of a filter or other suitable method. In one embodiment of the invention, the acidified dairy composition obtained in step c) is stirred to break the coagulum prior to the smoothening of step d). In one embodiment of the invention, no cooling is applied to the acidified dairy product after the acidification step c) and before the smoothening of step d).

In an alternative embodiment of the invention, the acidified dairy product is cooled after the acidification step c) and before the smoothening of step d).

In an embodiment of the invention, the smoothening involves the use of a back-pressure valve with a back pressure drop of at least 2.5 bar. Preferably, the back pressure drop is at least 3 bar, more preferably at least 5 bar, or even more preferred at least 10 bar.

In a preferred embodiment of the invention, the smoothening involves the use of a slot filter for straining the acidified dairy composition. One advantage by using the filter technology for smoothening is that filter units are standard equipment in most dairies and are therefore easily used for smoothening the acidified dairy composition. The slot filter preferably having a pore size of at most 100 micron, preferably at most 75 micron and more preferably at most 50 micron. The slot filter involves a pressure drop of at least 5 bar, preferably at least 10 bar, more preferably at least 20 bar.

In a preferred embodiment of the invention, the method of preparing a high protein, acidified dairy product comprises the steps of
- a) providing a liquid composition having a pH in the range of 5.5-8.0, which
  - comprises a total amount of protein of in the range of 8-15% w/w, and
  - comprises a total amount of micellar casein of at least 60% w/w based on total protein
- b) heating the liquid composition of step a) to a temperature of at least 70 degrees C. for a duration of time sufficient to obtain at least partial microbial reduction,
- c) subjecting the heat-treated, liquid composition of step b) to at least one acidification step using an acidifying agent, thereby obtaining an acidified dairy composition,
- d) smoothening the acidified dairy composition, and
- e) optionally, packaging the acidified dairy product comprising, or even consisting of, the acidified dairy composition of step c) or step d),
  - wherein the smoothening of step d) involves using a slot filter preferably having a pore size of at most 100 micron.

In a preferred embodiment of the invention, the acidified dairy composition is smoothened in a slot filter having a pore size of at most 100 microns with a pressure drop of at least 2.5 bar; and the smoothened acidified composition has a smooth texture without visible lumps. The presence of lumps can be tested by visually controlling the smoothened acidified composition or the high protein, acidified dairy product for lumps visible to the naked eye, e.g. by visual inspection of a spoonful of the smoothened acidified composition or the high protein, acidified dairy product.

The use of a slot filter for smoothening the acidified dairy composition has the advantage that the smoothening effect is durable. In a more preferred embodiment of the invention, the acidified dairy composition is smoothened in a slot filter having a pore size of at most 100 microns with a pressure drop of at least 2.5 bar; and the smoothened acidified composition has a smooth texture without visible lumps after 1, 2, 3 or 4 weeks of storage.

In a preferred embodiment of the invention, the smoothened acidified composition has a smooth texture without visible lumps after 4 weeks of storage as shown in example 3.

In a preferred embodiment of the invention, the acidified composition is cooled after the acidification step c) or after the smoothening of step d). The acidified composition may be cooled to room temperature, preferably a temperature in the range of 20-30 degrees C., or more preferably about 25 degrees C. The cooled acidified composition may then be filled into appropriate containers, e.g. bottles, cartons, bricks, pouches and/or bags. The acidified dairy may then be further cooled in the container preferably to a temperature in the range of 2-7 degrees C. such as for example 5 degrees C.

In other preferred embodiments, pasteurised fruit and/or other ingredients are added after the smoothening step d).

Step e) involves packaging of the high protein, acidified dairy product derived from the acidified composition of step c) or d) and is optional.

If the high protein, acidified dairy product is to be used as an ingredient for another food product, packaging may not be required. Thus, in some preferred embodiments of the invention, the present method therefore does not comprise step d).

However, in other preferred embodiments of the invention, the method of the invention comprises the packaging of step d).

In some preferred embodiments, the high protein, acidified dairy product comprises, or even consists of the acidified composition and optionally one or more additional ingredients.

In some preferred embodiments, the high protein, acidified dairy product comprises at least 40% w/w of the acidified composition and at most 60% w/w additional ingredients. Preferably, the high protein, acidified dairy product comprises at least 50% w/w of acidified composition and at most 50% w/w additional ingredients. More preferably, the high protein, acidified dairy product comprises at least 60% w/w of acidified composition and at most 40% w/w additional ingredients. Even more preferably, the high protein, acidified dairy product comprises at least 70% w/w of the acidified composition and at most 30% w/w additional ingredients.

In some preferred embodiments, the high protein, acidified dairy product comprises at least 70% w/w of the acidified composition and at most 30% w/w additional ingredients. Preferably, the high protein, acidified dairy product comprises at least 80% w/w of acidified composition and at most 20% w/w additional ingredients. More preferably, the high protein, acidified dairy product comprises at least 85% w/w of acidified composition and at most 15% w/w additional ingredients. Even more preferably, the high protein, acidified dairy product comprises at least 90% w/w of the acidified composition and at most 10% w/w additional ingredients.

In some preferred embodiments, the high protein, acidified dairy product is the acidified composition obtained from step c).

In other preferred embodiments, the high protein, acidified dairy product is the acidified composition obtained from step d).

As described herein, the addition ingredient(s) could e.g. be a fruit preparation and/or sweetener.

The packaging step e) may involve any suitable packaging techniques, and any suitable container may be used for packaging the high protein, acidified dairy product.

Examples of useful containers are e.g. bottles, cartons, bricks, pouches and/or bags.

The packaging is preferably performed at or below room temperature. Thus, the temperature of the product is preferably at most 30 degrees C. during the packaging, preferably, at most 25 degrees C., and even more preferably at most 20 degrees C., such as at most 10 degrees C.

The temperature of the product during packaging may for example be in the range of 2-30 degrees C., and preferably in the range of 20-30 degrees C., such as at 25 degrees C.

Yet an aspect of the invention pertains to a high protein, acidified dairy product, preferably obtainable according to the method described herein.

The inventors have observed that the high protein, acidified dairy product of the present invention offers significant advantages over prior art products (see e.g. example 3) and e.g. provides a viscous diary dairy product which is easier to ingest (swallow), and provides less stickiness, dryness than comparable prior art products. Additionally, the high protein, acidified dairy product of the present invention provides a smoother product without formation of lumps during storage (see e.g. FIG. 2 where the prior art product of FIG. 2b developed a lumpy, grainy texture during storage whereas the present high protein, acidified dairy product maintained a smooth consistency).

In some preferred embodiments of the invention, the high protein, acidified dairy product is a yoghurt, a yoghurt-like product, a skyr or a skyr-like product. Skyr or a skyr-like product is perceived as high viscosity products and is spoonable but often not pourable. The high protein, acidified dairy product is preferably a high viscosity product, which is spoonable, and preferably not pourable. In some preferred embodiments of the invention, the high protein, acidified dairy product has a viscosity of at least 3500 cP at 5 degrees C. at a shear rate of 50/s. In a more preferred embodiment of the invention, the high protein, acidified dairy product has a viscosity of at least 4000 cP at 5 degrees C. at a shear rate of 50/s. In an even more preferred embodiment of the invention, the high protein, acidified dairy product has a viscosity of at least 4500 cP at 5 degrees C. at a shear rate of 50/s.

In some preferred embodiments of the invention, the high protein, acidified, dairy product is a stirred acidified dairy product such as e.g. a stirred yoghurt or yoghurt-like product.

In some preferred embodiments of the invention, the viscosity of the high protein, acidified dairy product may be even higher, for example, a viscosity of at least 5000 cP at 5 degrees C. at a shear rate of 50/s. In a more preferred embodiment of the invention, the high protein, acidified dairy product has a viscosity of at least 5500 cP at 5 degrees C. at a shear rate of 50/s. In an even more preferred embodiment of the invention the high protein, acidified dairy product has a viscosity of at least 6000 cP at 5 degrees C. at a shear rate of 50/s, such as at least 7000 cP at 5 degrees C. at a shear rate of 50/s.

In some preferred embodiments of the invention, the high protein, acidified dairy product has a viscosity in the range of 3500-7000 cP at 5 degrees C. at a shear rate of 50/s. In a more preferred embodiment of the invention, the high protein, acidified dairy product has a viscosity of in the range of 4000-6500 cP at 5 degrees C. at a shear rate of 50/s. In an even more preferred embodiment of the invention the high protein, acidified dairy product has a viscosity in the range of 4500-6000 cP at 5 degrees C. at a shear rate of 50/s, such as in the range of 5000-5500 cP at 5 degrees C. at a shear rate of 50/s.

The viscosity of a high protein, acidified dairy product is measured according to Example 1.3, which performs the measurement at a temperature of 5 degrees C. and a shear rate of 50/s.

The compositional and nutritional embodiments described in the context of the liquid composition equally apply to the high protein, acidified dairy product, except for the pH, which is at most 5.2. In a particularly preferred embodiment of the invention, the high protein, acidified dairy product of the smoothened acidified composition obtained from step d).

In a preferred embodiment of the invention, the high protein, acidified dairy product has a volume weighted mean particle diameter, D[4,3], of at most 100 micron.

In some preferred embodiments of the invention, the high protein, acidified dairy product has a volume weighted mean particle diameter of at most 50 micron. Preferably, the high protein, acidified dairy product has a volume weighted mean particle diameter of at most 40 micron. More preferably, the high protein, acidified dairy product has a volume weighted mean particle diameter of at most 30 micron, more preferably, the high protein, acidified dairy product has a volume weighted mean particle diameter of at most 20 micron. More preferably, the high protein, acidified dairy product has a volume weighted mean particle diameter of at most 10 micron. Even more preferably, the high protein, acidified dairy product has a volume weighted mean particle diameter of at most 5 micron. More preferably, the high protein, acidified dairy product has a volume weighted mean particle diameter of at most 1 micron.

In some preferred embodiments of the invention, the high protein, acidified dairy product has a volume weighted mean particle diameter in the range of 1-50 micron. Even more preferably, the high protein, acidified dairy product has a volume weighted mean particle diameter in the range of 5-40 micron. More preferably, the high protein, acidified dairy product has a volume weighted mean particle diameter in the range of 10-30 micron. Even more preferably, the high protein, acidified dairy product has a volume weighted mean particle diameter in the range of 1-15 micron. Most preferably, the high protein, acidified dairy product has a volume weighted mean particle diameter in the range of 1-10 micron.

The high protein, acidified dairy product comprises an amount of total solids in the range of 4-50% w/w. Preferably, the high protein, acidified dairy product comprises an amount of total solids in the range for example of 10-45% w/w. More preferably, the high protein, acidified dairy product comprises an amount of total solids in the range of 20-40% w/w. Even more preferably, the high protein, acidified dairy product comprises an amount of total solids in the range of 20-30% w/w. More preferably, the high protein, acidified dairy product comprises an amount of total solids in the range of 25-30% w/w.

The inventors have found that the content of minerals in the high protein, acidified dairy product influences the taste of the product, especially the content of calcium and magnesium is important for the overall taste and sensory properties of the product.

Thus, in a preferred embodiment of the invention, the high protein, acidified dairy product contains a total amount of calcium and magnesium of at most 0.30% w/w. In a more preferred embodiment of the invention, the high protein, acidified dairy product contains a total amount of calcium and magnesium of at most 0.28% w/w, more preferably, at most 0.26% w/w, more preferably, at most 0.24% w/w, more preferably, at most 0.22% w/w, even more preferably, at most 0.20% w/w, most preferably, at most 0.18% w/w.

In a preferred embodiment of the invention, the high protein, acidified dairy product contains a total amount of calcium and magnesium in the range of 0.05-0.3% w/w. In a more preferred embodiment of the invention, the high protein, acidified dairy product contains a total amount of calcium and magnesium in the range of 0.1-0.28% w/w, more preferably in the range of 0.1-0.26% w/w, more preferably in the range of 0.1-0.24% w/w, more preferably in the range of 0.1-0.22% w/w, even more preferably in the range of 0.1-0.20% w/w, most preferably in the range of 0.1-0.18% w/w.

In a preferred embodiment of the invention, the high protein, acidified dairy product has a weight ratio between protein and the sum of Ca and Mg of at least 32, preferably at least 33, more preferably at least 34, and even more preferably at least 36. Even higher weight ratios may be preferred, thus, the high protein, acidified dairy product may preferably have a weight ratio between protein and the sum of Ca and Mg of at least 40, more preferably at least 45, and even more preferred at least 50.

In a preferred embodiment of the invention, the high protein, acidified dairy product has a weight ratio between protein and the sum of Ca and Mg in the range of 32 to 100, preferably in the range of 33-75, more preferably in the range of 33-50, and even more preferably in the range of 33-45. In a most preferred embodiment of the invention, the high protein, acidified dairy product has a weight ratio between protein and the sum of Ca and Mg in the range of 33-40.

In other preferred embodiments of the invention, the high protein, acidified dairy product has a weight ratio between protein and the sum of Ca and Mg in the range of 34 to 100, preferably in the range of 35-90, more preferably in the range of 40-80, and even more preferably in the range of 45-70. In a most preferred embodiment of the invention, the high protein, acidified dairy product has a weight ratio between protein and the sum of Ca and Mg in the range of 50-60.

In a further aspect the invention pertains to a protein powder comprising
 a water content of at most 7% w/w,
 a total amount of protein of at least 50% w/w, and
 a total amount of micellar casein of at least 50% w/w based the total amount of protein.

Another aspect of the invention pertains to a protein powder, preferably suitable for producing a high-protein, acidified, dairy product having a viscosity of at least 3500 cP at 5 degrees C. at a shear rate of 50/s, said protein powder having:
 a water content of at most 7% w/w,
 a total amount of protein of at least 50% w/w, and
 a total amount of micellar casein of 60-80% w/w based on the total amount of protein,
 a total amount of insoluble particles of denatured whey protein in the range of 5-18 w/w total protein,
 a total amount of non-denatured beta-lactoglobulin (BLG) in the range of 1-15% w/w based in total protein,
 a volume weighted mean particle diameter, D[4,3], of at most 10 micron, and
 a weight ratio between the total amount protein and the sum of calcium and magnesium of at least 36.

In the context of the present invention, the term "powder" pertains to a product wherein the product contains water in an amount of at most 7% w/w, preferably at most 5% w/w, and even more preferably at most 4% w/w.

In some preferred embodiments of the invention, the protein powder has the solids composition of the solids of a liquid composition as defined herein having a solids content of 20% w/w. And any compositional or nutritional embodiment described in the content of the liquid composition may equally apply to the embodiments of the protein powder, except for the higher water content of the liquid composition.

In a preferred embodiment of the invention, the protein powder comprises a total amount of protein of at least 60% w/w, more preferred at least 70% w/w, even more preferred at least 80% w/w and most preferred at least 85% w/w.

The amount of micellar casein in the protein powder is preferably at least 52% w/w based the total amount of protein, or more preferred at least 55% w/w based on the total amount of protein.

In a preferred embodiment of the invention, the amount of micellar casein in the protein powder is preferably in the range of 50-60% w/w based on the total amount of protein. In a more preferred embodiment, the amount of micellar casein in the protein powder is preferably in the range of 52-58% w/w based on the total amount of protein. In an even more preferred embodiment of the invention, the amount of micellar casein in the protein powder is preferably in the range of 54-56% w/w based on the total amount of protein, such as about 55% w/w.

In some preferred embodiments of the invention, the total amount of protein of the protein powder comprises at least 60% w/w micellar casein. More preferably, the total amount of protein of the protein powder comprises at least 65% w/w micellar casein. More preferably, the total amount of protein of the protein powder comprises at least 68% w/w micellar casein and most preferably at least 69% w/w micellar casein.

Even higher concentrations of micellar casein may be useful, and in some preferred embodiments of the invention, the total amount of protein of the protein powder comprises at least 75% w/w micellar casein. More preferably, the total amount of protein of the protein powder comprises at least 85% w/w micellar casein. More preferably, the total amount of protein of the protein powder comprises at least 90% w/w micellar casein, and most preferably at least 95% w/w micellar casein.

In some preferred embodiments of the invention, the total amount of protein of the protein powder comprises in the range of 60-80% of micellar casein, more preferably 65-75% w/w, even more preferably 68-72% w/w and most preferably at in the range of 69-70% w/w.

In a preferred embodiment of the invention, the protein powder comprises a total amount of protein of in the range of 8-15% w/w and comprises a total amount of micellar casein of in the range of 60-80% w/w based on the total amount of protein. In a more preferred embodiment of the invention, the protein powder comprises a total amount of protein of in the range of 8-15% w/w and comprises a total amount of micellar casein of in the range of 65-75% w/w based on the total amount of protein.

In some embodiments of the invention, the protein powder comprises 0.5-5% w/w caseinomacropeptide (CMP) based on the total amount of protein, and preferably 0.5-2% w/w, or even more preferred 1-1.5% w/w.

In a preferred embodiment of the invention, the protein powder may further comprise insoluble particles of denatured whey protein. Preferably, the amount of insoluble particles of denatured whey protein is at most 20% w/w based on the total amount of protein. In a more preferred embodiment of the invention, the amount of insoluble particles of denatured whey protein is at most 18% w/w based on the total amount of protein. In a more preferred embodiment of the invention, the amount of insoluble particles of denatured whey protein is at most 16% w/w based on the total amount of protein.

The amount of insoluble particles of denatured whey protein in the protein powder may be in the range of 1-20 w/w based on the total amount of protein, preferably in the range of 5-18% w/w, more preferred in the range of 8-16% w/w, and even more preferably in the range of 10-15% w/w based on the total amount of protein.

A further preferred embodiment of the invention concerns a protein powder comprising
- a water content of at most 7% w/w,
- a total amount of protein of at least 75% w/w,
- a total amount of micellar casein of at least 50% w/w based on the total amount of protein, and
- a total amount of insoluble particles of denatured whey protein in the range of 1-20% w/w, preferably 5-15% w/w based on the total amount of protein.

Yet a further preferred embodiment of the invention concerns a protein powder comprising
- a water content of at most 7% w/w,
- a total amount of protein of at least 80% w/w,
- a total amount of micellar casein of at least 50% w/w based the total amount of protein, and
- a total amount of insoluble particles of denatured whey protein in the range of 1-20% w/w, preferably 5-18% w/w based on the total amount of protein, preferably in the range of 8-13% w/w, or more preferred in the range of 10-12% w/w.

A further preferred embodiment of the invention concerns a protein powder comprising
- a water content of at most 7% w/w,
- a total amount of protein of at least 75% w/w,
- a total amount of micellar casein of 50-60% w/w based on the total amount of protein, and
- a total amount of insoluble particles of denatured whey protein in the range of 1-20% w/w, preferably 5-15% w/w based on the total amount of protein.

Yet a further preferred embodiments of the invention concerns a protein powder comprising
- a water content of at most 7% w/w,
- a total amount of protein of at least 80% w/w,
- a total amount of micellar casein of 50-60% w/w based on the total amount of protein, and
- a total amount of insoluble particles of denatured whey protein in the range of 1-20% w/w, preferably, 5-18% w/w based on the total amount of protein, preferably in the range of 8-13% w/w, or more preferred in the range of 10-12% w/w.

A further preferred embodiment of the invention concerns a protein powder comprising
- a water content of at most 7% w/w,
- a total amount of protein of at least 75% w/w,
- a total amount of micellar casein of 60-80% w/w based on the total amount of protein, and
- a total amount of insoluble particles of denatured whey protein in the range of 1-20% w/w, preferably 5-15% w/w based on the total amount of protein.

An even further preferred embodiment of the invention concerns a protein powder comprising
- a water content of at most 7% w/w,
- a total amount of protein of at least 80% w/w,
- a total amount of micellar casein of 60-80% w/w based the total amount of protein, and
- a total amount of insoluble particles of denatured whey protein in the range of 1-20% w/w, preferably 5-18% w/w based on the total amount of protein, more preferably in the range of 8-13% w/w, and most preferred in the range of 10-12% w/w.

In some preferred embodiments of the invention, the protein powder comprises
- a water content of at most 7% w/w,
- a total amount of protein of at least 80% w/w,
- a total amount of micellar casein of 60-80% w/w based the total amount of protein, and
- a total amount of insoluble particles of denatured whey protein in the range of 8-18% w/w, preferably 10-18% w/w based on the total amount of protein.

The protein powder may further comprise native beta-lactoglobulin in an amount of 1-15% w/w based on the total amount of protein. Preferably, the total amount of native beta-lactoglobulin in the protein powder is in the range of 5-12% w/w based on the total amount of protein, or even more preferably in the range of 8-10% w/w.

A further embodiment of the invention concerns to a protein powder comprising
- a water content of at most 7% w/w,
- a total amount of protein of at least 75% w/w,
- a total amount of micellar casein of at least 50% w/w based the total amount of protein,
- a total amount of insoluble particles of denatured whey protein in the range of 1-20% w/w, preferably 5-18% w/w based on the total amount of protein, and
- native beta-lactoglobulin (BLG) in an amount of 1-15% w/w based on the total amount of protein.

Another preferred embodiment of the invention concerns to a protein powder comprising
- a water content of at most 7% w/w,
- a total amount of protein of at least 80% w/w,
- a total amount of micellar casein of at least 50% w/w based the total amount of protein,
- a total amount of insoluble particles of denatured whey protein in the range of 1-20% w/w, preferably 5-18% w/w based on the total amount of protein, such as in the range of 8-13% w/w, or more preferred in the range of 10-12% w/w, and
- native beta-lactoglobulin (BLG) in the range of 5-12% w/w based on the total amount of protein or even more preferably in the range of 8-10% w/w.

A further embodiment of the invention concerns to a protein powder comprising
- a water content of at most 7% w/w,
- a total amount of protein of at least 75% w/w,
- a total amount of micellar casein of 50-60% w/w based the total amount of protein,
- a total amount of insoluble particles of denatured whey protein in the range of 1-20% w/w, preferably 5-18% w/w based on the total amount of protein, and
- native beta-lactoglobulin (BLG) in an amount of 1-15% w/w based on the total amount of protein.

Another preferred embodiment of the invention concerns to a protein powder comprising
- a water content of at most 7% w/w,
- a total amount of protein of at least 80% w/w,
- a total amount of micellar casein of 50-60% w/w based on the total amount of protein,
- a total amount of insoluble particles of denatured whey protein in the range of 1-20% w/w, preferably 5-18% w/w based on the total amount of protein, such as in the range of 8-13% w/w, or more preferred in the range of 10-12% w/w, and
- native beta-lactoglobulin (BLG) in the range of 5-12% w/w based on the total amount of protein, or even more preferably in the range of 8-10% w/w.

In one embodiment of the invention, the protein powder further comprises lipid. The content of lipid may be in the range of 0.1-5% w/w, such as in the range of 2-3%.

In a preferred embodiment of the invention, the protein powder is low in lactose. The protein powder may comprise in the range of 0.1 to 10% w/w of lactose. In a more preferred embodiment of the invention, the protein powder comprises in the range of 2-6% w/w of lactose, or even more preferably about 5% w/w.

In some preferred embodiments of the invention, the lipid comprises milk lipid. For example, the protein powder comprises one or more milk lipid sources, e.g. selected from the group consisting of cream, butter, butter fat, anhydrous milk fat, whey fat, and combinations thereof.

The inventors have found that the size of the particles in the protein powder is important when the powder is used for food products, which are smoothed by use of a filter, e.g. a slot filter having pore size of 100 micron.

In some embodiments of the invention, the protein powder has a volume weighted mean particle diameter, D[4,3] of at most 50 micron. It should be noted that the volume weighted mean particle diameter pertains to the particle size as measured by Example 1.1 and is a measurement of the particle size of the powder dispersed in water and not the particle size of the dry powder.

In some preferred embodiments of the invention, the protein powder has a volume weighted mean particle diameter of at most 30 micron. Preferably, the protein powder has a volume weighted mean particle diameter of at most 20 micron. More preferably, the protein powder has a volume weighted mean particle diameter of at most 10 micron. Even more preferably, the protein powder has a volume weighted mean particle diameter of at most 5 micron. Most preferably, the protein powder has a volume weighted mean particle diameter of at most 1 micron.

More preferably, the protein powder has a volume weighted mean particle diameter in the range of 0.3-50 micron. Even more preferably, the protein powder has a volume weighted mean particle diameter in the range of 0.4-20 micron. More preferably, the protein powder has a volume weighted mean particle diameter in the range of 0.5-20 micron. Even more preferably, the protein powder has a volume weighted mean particle diameter in the range of 0.6-15 micron. Most preferably, the protein powder has a volume weighted mean particle diameter in the range of 0.7-10 micron.

The content of minerals in protein powder influences the taste of the food product produced with the powder. In particular, the content of calcium and magnesium can be important for the overall taste of the product.

Thus, in some preferred embodiments of the invention, the protein powder contains a total amount of calcium and magnesium of at most 2.4% w/w. In a more preferred embodiment of the invention, the protein powder contains a total amount of calcium and magnesium of at most 2.3% w/w, more preferably at most 2.1% w/w, and most preferably at most 1.6% w/w.

In other preferred embodiments of the invention, the protein powder contains a total amount of calcium and magnesium in the range of 1-2.4% w/w. In a more preferred embodiment of the invention, the protein powder contains a total amount of calcium and magnesium in the range of 1.5-2.3% w/w, and even more preferably, in the range of 1.7-2.2 w/w.

In a preferred embodiment of the invention, the protein powder has a weight ratio between protein and the sum of Ca and Mg of at least 32, preferably at least 33, more preferably at least 34, and even more preferably at least 36. Even higher weight ratios may be preferred, thus, the protein powder may preferably have a weight ratio between protein and the sum of Ca and Mg of at least 40, more preferably at least 45, and even more preferred at least 50.

In a preferred embodiment of the invention, the protein powder has a weight ratio between protein and the sum of Ca and Mg in the range of 32 to 100, preferably in the range of 33-75, more preferably in the range of 33-50, and even more preferably in the range of 33-45. In a most preferred embodiment of the invention, the protein powder has a weight ratio between protein and the sum of Ca and Mg in the range of 33-40.

In other preferred embodiments of the invention, the protein powder has a weight ratio between protein and the sum of Ca and Mg in the range of 34 to 100, preferably in the range of 35-90, more preferably in the range of 40-80, and even more preferably in the range of 45-70. In a most preferred embodiment of the invention, the protein powder has a weight ratio between protein and the sum of Ca and Mg in the range of 50-60.

The protein powder may be prepared by blending a micellar casein concentrate with a denatured whey protein product comprising insoluble particles of denatured whey protein and optionally other ingredients, such as milk protein concentrate, whey protein concentrates and/or a whey protein isolate.

In some preferred embodiments of the invention, the powder contains a total amount of carbohydrate in the range of 5-55% w/w. Preferably, the powder contains a total amount of carbohydrate in the range of 20-50% w/w. Even more preferably, the powder contains a total amount of carbohydrate of 24-45% w/w.

In some preferred embodiments of the invention, the protein powder comprises native BLG in an amount of at most 15% w/w based on the total amount of protein. Preferably, the protein powder comprises native BLG in an amount of at most 13% w/w based on the total amount of protein. More preferably, the protein powder comprises native BLG in an amount of at most 12% w/w based on the total amount of protein. Even more preferably, the protein powder comprises native BLG in an amount of at most 8% w/w based on the total amount of protein.

In some preferred embodiments of the invention, the protein powder comprises native BLG in an amount of 1-15% w/w based on the total amount of protein. More preferably, the protein powder comprises native BLG in an amount of 5-13% w/w based on the total amount of protein. Even more preferably, the protein powder comprises native BLG in an amount of 6-12% w/w based on the total amount of protein. Most preferably, the protein powder comprises native BLG in an amount of 7-11% w/w based on the total amount of protein.

The pH of the protein powder is preferably in the range of pH 5.5-8.0, more preferably in the range of pH 6.0-7.5, and even more preferably in the range of pH 6.0-6.5.

Yet an aspect of the invention pertains to the use of the protein powder as defined herein for producing a high-protein, acidified dairy product. Preferably, wherein high-protein, acidified, dairy product has a viscosity of at least 3500 cP at 5 degrees C. at a shear rate of 50/s as measured by example 1.3. Preferably, wherein the production involves a step of smoothening and acidified dairy composition with a slot filter having a pore size of at most 100 micron. Preferably, wherein high-protein, acidified dairy product contains a total amount of protein of 9-15% w/w.

In some preferred embodiments of the invention, the use is for providing an improved taste of the high-protein, acidified dairy product, and preferably involves using a protein powder that contains a total amount of calcium and magnesium of at most 2.2% w/w.

The following numbered embodiments describe preferred embodiments of the invention:

Embodiment 1. A method of preparing a high protein, acidified dairy product comprising the steps of
a) providing a liquid composition having a pH in the range of 5.5-8.0, which
comprises a total amount of protein of in the range of 8-15% w/w,
comprises a total amount of micellar casein of at least 60% based on the total amount of protein,
b) heating the liquid composition of step a) to a temperature of at least 70 degrees C. for a duration of time sufficient to obtain at least partial microbial reduction,
c) subjecting the heat-treated, liquid composition of step b) to at least one acidification step using an acidifying agent, thereby obtaining an acidified dairy composition,
d) optionally, smoothening the acidified dairy composition, and
e) optionally, packaging the acidified dairy product comprising, or even consisting of, the acidified dairy composition of step c) or step d).

Embodiment 2. The method according to Embodiment 1, wherein the liquid composition contains a total amount of calcium and magnesium of at most 0.30% w/w, preferably at most 0.28% w/w, more preferably at most 0.26% w/w, and most preferably at most 0.24% w/w.

Embodiment 3. The method according to Embodiment 1 or 2, wherein the liquid composition has a weight ratio between protein and the sum of Ca and Mg of at least 32, preferably at least 33, more preferably at least 34, and even more preferably at least 36.

Embodiment 4. The method of any of the preceding Embodiments, wherein the high protein, acidified dairy product has a viscosity of at least 3500 cP at 5 degrees C. at a shear rate of 50/s as measured by example 1.3.

Embodiment 5. The method according to any of the preceding Embodiments, wherein the liquid composition comprises:
total amount of protein of in the range of 8-15% w/w
a total amount of micellar casein of in the range of 60-80% w/w based on total protein
a total amount of insoluble particles of denatured whey protein in the range of 1-15% w/w based on total protein
a total amount of native beta-lactoglobulin (BLG) in the range of 1-15% w/w based on total protein
wherein the liquid composition optionally has a volume weighted mean particle diameter, D[4,3], of at most 50 micron.

Embodiment 6. The method according to any of the preceding Embodiments, containing step d) and wherein the smoothening involves the use of a slot filter, preferably having a pore size of at most 100 micron, preferably at most 75 micron and more preferably at most 50 micron.

Embodiment 7. The method according to any of the preceding Embodiments, wherein the total amount of protein is in the range of 8.5-14% w/w, more preferably 9-13% w/w, and even more preferably 10-12% w/w.

Embodiment 8. The method according to any of the preceding Embodiments, wherein the total amount of protein comprises whey protein in the range of 20-40% w/w based on the total amount of protein, more preferably in the range of 25-35% w/w, even more preferably in the range of 28-32% w/w, and most preferably in the range of 30-31% w/w whey protein.

Embodiment 8. The method according to any of the preceding Embodiments, wherein the total amount of protein comprises in the range of 5-13% w/w of insoluble particles of denatured whey protein, more preferably 8-12% w/w, even more preferably 9-11% w/w.

Embodiment 9. The method according to any of the preceding Embodiments, wherein the total amount of protein comprises in the range of 60-80% of micellar casein, more preferably 65-75% w/w, even more preferably 68-72% w/w, and most preferably at in the range of 69-70% w/w.

Embodiment 10. The method according to any of the preceding Embodiments, wherein the liquid composition of step a) furthermore comprises lipid.

Embodiment 11. The method according to Embodiment 10, wherein the lipid comprises milk lipid and/or vegetable lipid.

Embodiment 12. The method according to Embodiment 10 or 11, wherein the liquid composition comprises one or more milk lipid sources, e.g. selected from the group consisting of cream, butter, butter fat, anhydrous milk fat, whey fat, and combinations thereof.

Embodiment 13. The method according to any of the Embodiments 10-12, wherein the liquid composition of step a) comprises lipid in an amount of at most 3.5% w/w.

Embodiment 15. The method according to any of the Embodiments 10-13, wherein the liquid composition of step a) comprises lipid in an amount of at least 4% w/w.

Embodiment 16. The method according to any of the Embodiments 10-13 and 15, wherein the liquid composition of step a) comprises lipid in an amount of in the range of 4-20% w/w.

Embodiment 17. The method according to any of the preceding Embodiments, wherein the liquid composition of step a) furthermore comprises carbohydrate.

Embodiment 18. The method according to Embodiment 17, wherein the carbohydrate comprises di- and/or monosaccharide.

Embodiment 19. The method according to any of Embodiments 17 or 18, wherein the total amount of carbohydrates is at least 5% w/w.

Embodiment 20. The method according to any of Embodiments 17 or 18, wherein the total amount of carbohydrates is at most 4% w/w.

Embodiment 21. The method according to any of any of Embodiments 17-20, wherein the carbohydrate comprises lactose.

Embodiment 22. The method according to Embodiment 21, wherein the total amount of lactose is at least 5% w/w.

Embodiment 23. The method according to Embodiment 21, wherein the total amount of lactose is at most 4%.

Embodiment 24. The method according to any of Embodiments 17-23, wherein the carbohydrate comprises a dietary fibre, preferably inulin.

Embodiment 25. The method according to any of the preceding Embodiments, wherein the liquid composition of step a) furthermore comprises one or more vitamin(s) and similar other ingredients, such as vitamin A, vitamin D, vitamin E, vitamin K, thiamine, riboflavin, pyridoxine, vitamin B12, niacin, folic acid, pantothenic acid, biotin, vitamin C, choline, vitamin B8, their salts, their derivatives and combinations thereof.

Embodiment 26. The method according to any of the preceding Embodiments, wherein the liquid composition of step a) comprises an amount of total solids in the range of 4-50% w/w.

Embodiment 27. The method according to Embodiment 26, wherein the liquid composition of step a) comprises an amount of total solids in the range of 15-30% w/w.

Embodiment 28. The method according to any of the preceding Embodiments, wherein the liquid composition of step a) furthermore comprises one or more non-carbohydrate natural or artificial sweetener.

Embodiment 29. The method according to any of Embodiments 1-28, wherein the liquid composition of step a) does not comprise non-carbohydrate natural or artificial sweetener.

Embodiment 30. The method according to any of the preceding Embodiments, wherein the liquid composition of step a) furthermore comprises carbohydrate-based stabilisers.

Embodiment 31. The method according to any of Embodiments 1-29, wherein the liquid composition of step a) does not comprise carbohydrate-based stabilisers.

Embodiment 32. The method according to any of the preceding Embodiments, wherein the heat treatment(s) of step b) is followed by cooling the liquid composition to a temperature at most 50 degrees C., preferably at most 45 degrees C.

Embodiment 33. The method according to any of the preceding Embodiments, wherein the acidifying agent comprises a bacterial culture.

Embodiment 34. The method according to any of the preceding Embodiments, wherein the acidifying agent comprises a chemical acidifying agent.

Embodiment 35. The method according to any of the preceding Embodiments, wherein the acidifying agent reduces pH of the liquid composition of step b) to a pH of at most 5.2, preferably at most 5.0, and even more preferably at most pH 4.8.

Embodiment 36. The method according to any of the preceding Embodiments, wherein the acidified dairy composition obtained in step c) is stirred to break the coagulum prior to the smoothening of step d).

Embodiment 37. The method according to any of the preceding Embodiments, wherein the smoothening of step d) involves a pressure drop of at least 2.5 bar, preferably at least 3 bar, more preferably at least 5 bar, or even more preferably at least 10 bar.

Embodiment 38. The method according to any of the preceding Embodiments, wherein the packaging step e) comprises any suitable packaging technique and use of any suitable container.

Embodiment 39. A high-protein, acidified, dairy product obtainable by the method according to any of Embodiments 1-36.

Embodiment 40. A high-protein, acidified, dairy product comprising:
  a total amount of protein of in the range of 8-15% w/w, and
  a total amount of micellar casein of at least 60% w/w based on total protein.

Embodiment 41. The high-protein, acidified, dairy product according to Embodiment 39 or 40 comprising particles having a volume weighted mean particle diameter, D[4,3], of at most 100 micron, and preferably at most 50 micron.

Embodiment 42. The high-protein, acidified dairy product according to any of the Embodiments 39-41 having a weight ratio between the total amount protein and the sum of calcium and magnesium of at least 32.

Embodiment 43. The high-protein, acidified dairy product according to any of the Embodiments 39-41 having a viscosity of at least 3500 cP at 5 degrees C. at a shear rate of 50/s as measured by example 1.3.

Embodiment 44. The high-protein, acidified dairy product according to any of Embodiments 39-43, wherein the high-protein, acidified dairy product is yoghurt, such as e.g. a stirred yoghurt or a set yoghurt.

Embodiment 45. The high-protein, acidified dairy product according to any of Embodiments 39-44, wherein the high-protein, acidified, dairy product is skyr or a skyr-like product.

Embodiment 46. A protein powder comprising
  a water content of at most 7% w/w,
  a total amount of protein of at least 50% w/w, and
  a total amount of micellar casein of at least 50% based on the total amount of protein.

Embodiment 47. The protein powder according to Embodiment 46 having a volume weighted mean particle diameter, D[4,3], of at most 100 micron, and preferably at most 50 micron.

Embodiment 48. The high-protein, acidified dairy product according to any of the Embodiments 45 or 47 having a weight ratio between the total amount protein and the sum of calcium and magnesium of at least 36.

Embodiment 49. Use of the protein powder according to any of Embodiments 46-48 for producing a high-protein, acidified dairy product having a viscosity of at least 3500 cP at 5 degrees C. at a shear rate of 50/s as measured by example 1.3.

It should be noted that the embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

EXAMPLES

Example 1: Methods of Analysis

Example 1.1: Quantification of I) the Amount of Insoluble Particles of Denatured Whey Protein and II) the Volume Weighted Mean Particle Diameter, D[4,3], of a Product Part I)—Quantification of the amount of insoluble particles of denatured whey protein:

The amount of insoluble particles of denatured whey protein of a product is determined using the following procedure:

1. Make a 5% (w/w in water) suspension of the sample to be tested. If the product to be tested is a suspension, it should be standardised to a total solids content of 5% w/w.

2. Let the resulting suspension hydrate for one hour with gentle agitation (stirring).

3. If the product to be analysed is a powder, homogenize the suspension at 200 bar at 15 degrees C.

4. Centrifuge a first portion of the suspension at 15000 g for 5 minutes. The procedure is performed at approx. 15 degrees C. using a refrigerated centrifuge 3-30K from SIGMA Laborzentrifugen GmbH and 85 mL tubes (Order no. 15076), in which the 5% suspension is filled so that the total weight of tube and sample amounts to 96 g.

5. Collect the resulting supernatant and analyse for total protein (true protein). The amount of total protein of the supernatant is referred to as "A".

6. Analyse a second portion of the suspension (not subjected to centrifugation) for total protein (true protein). The amount of total protein of the suspension is referred to as "B".

The amount of insoluble particles of denatured whey protein is calculated as: (B−A)/B*100% w/w Part II) Determining the volume weighted mean particle diameter, D[4,3], of the product:

1. Prepare suspension of the product to be tested by following steps 1-3 of Part I) above.
2. Mix 1 mL sample with 24 mL 2 g/l SDS and mix by gentle stirring
3. Sufficient amounts of the diluted sample was transferred into the sampling unit containing deionized water as dispersant to obtain 5-10% laser obscuration, most typically 7-8%.
4. Start particle size distribution analysis by static light scattering and determine values for the volume weighted mean size, D[4,3].

Particle size distribution analysis is performed using a Malvern Mastersizer 3000 (Malvern Instruments Ltd., Worcestershire, UK) equipped with a HydroLV sample dispersion unit.

Parameters: Particle refractive index 1.4 (real part), 0.1 (imaginary part) and dispersant refractive index 1.33 were used, 2000 rpm stirring, A minimum of 10 measurements of 15 seconds were performed for each sample.

Data analysis: The data was fitted using the Mie scattering model (residuals <2%) using the general purpose setting and calculated for non-spherical shaped particles.

Example 1.2: Determination of Native Alpha-Lactalbumin, Beta-Lactoglobulin and CMP The content of native alpha-lactalbumin, beta-lactoglobulin and CMP was analyzed by HPLC 30 analysis at 0.4 ml/min. 25 µl filtered sample is injected onto 2 TSKgel3000PWxl (7.8 mm 30 cm, Tosohass, Japan) columns connected in series with attached precolumn PWxl (6 mm×4 cm, Tosohass, Japan) equilibrated in the eluent (consisting of 465 g MilliQ water, 417.3 g acetonitrile and 1 mL triflouroacetic acid) and using a UV detector at 210 nm.

35 Quantitative determination of the contents of native alpha-lactalbumin ($C_{alpha}$), betalactoglobulin ($C_{beta}$), and caseinomacropeptide ($C_{CMP}$) was performed by comparing the peak areas obtained for the corresponding standard proteins with those of the samples.

Example 1.3: Determination of Viscosity

The viscosity of high protein acidified products expresses how thick/thin they are and depends on the shear rate at which they are measured. With this method the viscosity is measured on a rheometer using a defined bob/cup system and a shear rate of 50 s$^{-1}$. The described method is performed at a controlled temperature; 5° C., controlled by an external water bath. The result is presented in cP (corresponding to mPa s values) and a double or triple repetition is always carried out.

A higher viscosity corresponds to a thicker material. For high viscous products a longer initial resting time can be necessary to minimize the texture loss during loading in the measurement cup—with this method the initial resting period is 2 minutes.

With the QC rheometer it is possible to use a "disposable cup system" where the samples are filled directly in the "disposable" measurement cups during production, and hereby, disturbed less prior to measurement because no second "loading" is taking place.

Procedure:
1. Sample Preparation

For standard analysis, the final products are filled into plastic cups during production and stored cold for x number of days prior to measurement.

2. Setup

Ensure that black "temperature unit" is installed on the rheometer. Turn on water bath and set to correct temperature.

Open the method template "High viscosity or high protein" (see method setup in appendix). Save as workbook prior to first measurement.

Install the CC27 bob. Verify that the set temperature is reached.

3. Measuring Sample

The sample is taken from the cold storage just prior to measurement to ensure constant temperatures.

The cup is opened and the sample is gently stirred with a spoon 3 times to uniform the sample. If syneresis is observed then gently stir the sample until the syneresis is gone and the sample is uniform. Fill sample into CC27 cup to filling line (~20 ml).

Load cup onto instrument and lift carefully to avoid too much disturbance of sample. Start measurement. 2-3 repetitions are made from each code depending on the task.

When a disposable cup system is used, the prefilled disposable cup is pressed slightly into the cup holder and the holder is loaded on the instrument carefully to avoid too much disturbance of product.

4. Cleaning

When measurement is ended, dismantle the bob (it will drop into the cup), and afterwards the cup from the instrument if used.

Results:

The sample is allowed to rest for 2 minutes. Then shearing at 50/s is applied for 20 seconds, The viscosity in cP (mPa s) after 12 sec of shearing is noted, mean+stDev of the double or triple repetition is reported in result sheet.

Materials:

For this procedure the following is required:
Anton Paar QC rheometer
Disposable plastic cups

Example 1.4: Determination of Total Protein

The total protein content (true protein) of a sample is determined by:

1) Determining the total nitrogen of the sample following ISO 8968-1/2|IDF 020-1/2—Milk—Determination of nitrogen content—Part 1/2: Determination of nitrogen content using the Kjeldahl method.

2) Determining the non-protein nitrogen of the sample following ISO 8968-4|IDF 020-4—Milk—Determination of nitrogen content—Part 4: Determination of non-protein-nitrogen content.

3) Calculating the total amount protein as ($m_{total\ nitrogen} - m_{non-protein-nitrogen}$)*6.38.

Example 1.5: Determination of the Water Content of a Powder

The water content of a food product is determined according to ISO 5537:2004 (Dried milk—Determination of moisture content (Reference method)). NMKL is an abbreviation for "Nordisk Metodikkomité for Næringsmidler".

Example 1.6: Determination of Ash Content

The ash content of a food product is determined according to NMKL 173:2005 "Ash, gravimetric determination in foods".

Example 1.7: Determination of the Total Solids of a Solution

The total solids of a solution may be determined according NMKL 110 $2^{nd}$ Edition, 2005 (Total solids (Water)—Gravimetric determination in milk and milk products). NMKL is an abbreviation for "Nordisk Metodikkomité for Næringsmidler".

The water content of the solution can be calculated as 100% minus the relative amount of total solids (% w/w).

Example 1.8: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.9: Determination of the Degree of Denaturation

The denaturation degree of the proteins of the denatured whey protein compositions was analyzed by size exclusion high-performance liquid chromatography (SE-HPLC). A Waters 600 E Multisolvent Delivery System, a Waters 700 Satellite Wisp Injector, and a Waters H90 Pro grammable Multiwavelength Detector (Waters, Milford, MA, USA) were used. The elution buffer was composed of 0.15 M Na2S04, 0.09 M KH2P04 and 0.01 M K2HP04. The flow rate was 0.8 mL min-1 and the temperature 20° C.

Twenty-four hours prior to analysis, suspensions of the denatured whey protein compositions were prepared by using a sodium phosphate buffer (0.02 M) to obtain a final protein content of 0.1% w/v. In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4.

A quantitative analysis of the native whey protein content was performed by comparing the peak areas obtained for the corresponding standard proteins with those of the samples. Afterwards, the denatured whey protein content of the denatured whey protein compositions were calculated by considering the total protein content of the samples and their quantified native protein. The degree of denaturation was calculated as $(w_{total\ protein} - w_{soluble\ protein})/w_{total\ protein} * 100\%$, wherein $w_{total\ protein}$ is the weight of total protein and $w_{soluble\ protein}$ is the weight of soluble protein.

Example 1.10: Determination of the Total Amounts of Calcium, Magnesium, Sodium, and Potassium The total amount of calcium, magnesium, sodium, and potassium cations are determined using a procedure, in which the samples are first decomposed using microwave digestion and then the total amount of mineral(s) is determined using an ICP apparatus.

Apparatus:

The microwave is from Anton Paar and the ICP is an Optima 2000DV from PerkinElmer Inc.

Materials:
1 M $HNO_3$
Yttrium in 2% $HNO_3$
Suitable standards for calcium, magnesium, sodium, and potassium in 5% $HNO_3$ Pre-Treatment:

Weigh out a certain amount of powder and transfer the powder to a microwave digestion tube. Add 5 mL 1M $HNO_3$. Digest the samples in the microwave in accordance with microwave instructions.

Place the digested tubes in a fume cupboard, remove the lid and let volatile fumes evaporate.

Measurement Procedure:

Transfer the pre-treated sample to the digitube using a known amount of Milli-Q water. Add a solution of yttrium in 2% HNO3 to the digestion tube (about 0.25 mL per 50 mL diluted sample) and dilute to known volume using Milli-Q water. Analyze the samples on the ICP using the procedure described by the manufacturer.

A blind sample is prepared by diluting a mixture of 10 mL 1M $HNO_3$ and 0.5 mL solution of yttrium in 2% $HNO_3$ to a final volume of 100 mL using Milli-Q water.

At least 3 standard samples are prepared having concentrations, which bracket the expected sample concentrations.

Example 1.11: Determination of pH

All pH values are measured using a pH glass electrode and are normalised to 25 degrees C.

The pH glass electrode (having temperature compensation) is rinsed carefully before and calibrated before use.

When the sample is in liquid form, then pH is measured directly in the liquid solution at 25 degrees C.

When the sample is a powder, 10 gram of a powder is dissolved in 90 ml of demineralised water at room temperature while stirring vigorously. The pH of the solution is then measured at 25 degrees C.

Example 1.12: Sensory Evaluation

This sensory evaluation is used as a method to describe and compare a group of formulas. The results are relative. The sensory panel consists of technical personnel who are trained to evaluate fresh dairy products. The panel is usually consists of 3-5 persons. There are no reference samples to determine the level between 0 and 10 on the scale, so the evaluation is based on experience, knowing the average grades for the type of product.

Example: The sample with the highest relative mouthfeel in the group of formula is not graded 10, but often given a grade according to what is normal for this type of product.

Products can be evaluated by a trained sensory test panel. The product is evaluated and ranked by the following characteristics:

| Category | Descriptors |
|---|---|
| Syneresis | If there is no visible syneresis, the sample is graded with a 0. The higher the syneresis, the higher grade on the scale. The scale is available from 0 to 10. |

-continued

| Category | Descriptors |
|---|---|
| Spoon viscosity | A spoonful of the sample is placed on the surface of the product. This procedure is done for each sample in the evaluation before the samples are graded. The spoon viscosity is evaluated based on the products ability to "flow" and if the spoonful of sample keeps its shape. The higher the viscosity, the highergrade on the scale. The scale is available from 0 to 10. |
| Shininess | The sample is evaluated for shininess by looking at a thin layer of product on the back of the spoon. If the sample is homogeneous without gel lumps, or white spots it is graded higher compared to a sample with gel lumps or white spots. The scale is available from 0 to 10. |
| Stickiness | By tasting, the sample is evaluated on how much it feels sticking to the palate and tongue during consumption. If the sample has a high sticky feeling in the mouth, it is graded higher compared to samples having a less sticky perception. The scale is available from 0 to 10. |
| Easy to swallow | By tasting, the sample is evaluated on how easy it is to swallow. The easier the yoghurt are flowing from the mouth through to the throat the higher the sample will score compared to samples, which needs more squishing with the muscles placed in the top of the throat. |
| Smooth-ness | By tasting, the sample is evaluated on how smooth the sample is perceived. If the sample has a high smooth feeling in the mouth, it is graded higher compared to samples having a less smooth perception. A grainy sensation is evaluated lower than a dry sensation. The scale is available from 0 to 10. |
| Dryness | By tasting, the sample is evaluated for dryness. If there is any dry sensation in the yoghurt, the dryness is evaluated regarding to the ranking no dryness, dry, floury, sandy, or grainy. The scale is available from 0 to 10. |

If more than one sample is evaluated, the samples are compared and ranked according to the parameters evaluated. Samples are allowed to score equal in evaluation.

The first evaluation is conducted within the first week after production and thereafter once a week, if requested.

Example 2: Production of a Denatured Whey Protein Product Comprising Insoluble Particles of Denatured Whey Protein A denatured whey protein product was prepared using the following method:

Solution:

An aqueous solution containing sweet whey protein concentrate was prepared by dissolving the whey protein concentrate in water to obtain a dry-matter content of 16% and adjusting the pH to 6.4.

Denaturation and Microparticulation:

Denaturation and microparticulation was performed in a 6+6 Scraped Surface Heat Exchanger (SSHE), APV Shear Agglomerator, from APV/SPX, Denmark.

After passage through a holding cell (60 sec), the product was cooled down in a SSHE followed by a plate heat-exchanger (PHE) to 10° C.

During the heat-treatment (80 degrees C. for a duration of 10 minutes), the protein was denaturated and particles having a volume weighted mean particle diameter of approx. 1 micron were formed. The amount of insoluble particles of denatured whey protein was approx. 67% w/w.

The product suspension was pumped to a storage tank, and some of it was subsequently dried to a powder by means of spray-drying.

Example 3: Production of High Protein, Acidified Dairy Product

Samples of high protein, acidified dairy products were prepared using the following ingredients and the following procedure.

Procedure:

The dry ingredients were blended with the liquids with a high-shear mixer until dispersed and then allowed to hydrate at 5 degrees C. for 0.5 hour. After the hydration, the liquid composition was preheated to 65 degrees C. and then homogenised in two stages at 250 bar and 50 bar at 65 degrees C., respectively. The compositions were subsequently heat-treated to a temperature of 90 degrees C. for 5 minutes using a plate heat-exchanger and then cooled to 42 degrees C. Once cooled, the heat-treated compositions were mixed with a yoghurt starter culture (Culture YF-L812, Chr. Hansen A/S, Denmark) in an amount of 0.02% w/w and the inoculated mixtures were allowed to incubate at 42 degrees C. until a pH of 4.6 was reached.

The acidified compositions were subjected to smoothing at 42 degrees C. using a slot filter with a pore size of 100 microns and a pressure drop of 3 bar.

The resulting smoothened high protein, acidified dairy products were finally packaged in appropriate containers and cooled in the containers to 5 degrees C. The containers were hereafter stored at 5 degrees C. for up to four weeks.

Ingredients and Sample Composition:

A liquid composition (table 2) was prepared based on following protein powder compositions (table 1) prepared by mixing a micellar casein concentrate, the denatured whey protein product of example 2 and a milk protein concentrate.

TABLE 1

Composition of a protein powder of the invention.

| Component | Protein powder Amount in % w/w |
|---|---|
| Total protein | 81% |
| Lactose | 5% |
| Lipid | 3% |
| Ash | 7% |
| Calcium | 1.8% |
| Magnesium | 0.2% |
| Protein composition relative to total protein: | |
| Micellar casein | 65.4% w/w |
| Total whey protein | 34.6% w/w |
| Native whey protein | 16.4% w/w |
| Insoluble particles of denatured whey protein | 15.2% w/w |
| Native beta-lactoglobulin (BLG) | 10.6% |

TABLE 2

Overview of ingredients of the liquid compositions used for producing the high protein acidified dairy product.

| Ingredients % w/w | Liquid composition 1 | Liquid composition 2 | Liquid composition 3 |
|---|---|---|---|
| Protein powder (see above) | 9.2% w/w | 8.0% w/w | 10.5% w/w |
| Sugar | 5.0% w/w | 5.0% w/w | 5.0% w/w |
| Cream, 38% fat | 3.3% w/w | 3.3% w/w | 3.3% w/w |
| Skimmed milk, 3% protein | 82.5% w/w | 83.7% w/w | 81.2% w/w |
| Nutritional composition % w/w | | | |
| Protein | 10.0% | 9.4% | 11.3% |
| Fat | 1.6% | 1.6% | 1.7% |
| Carbohydrate | 9.3% | 9.3% | 9.3% |
| Lactose | 4.3% | 4.3% | 4.3% |
| Total solids | 21.7% | Not measured | Not measured |
| Calcium + Magnesium | 0.26% | Not measured | Not measured |

TABLE 2-continued

Overview of ingredients of the liquid compositions used for producing the high protein acidified dairy product.

| Ingredients % w/w | Liquid composition 1 | Liquid composition 2 | Liquid composition 3 |
|---|---|---|---|
| The liquid composition has the following distribution of proteins based on the total amount of protein: | | | |
| Micellar casein | 69.4% | 69.9% | 69.1% |
| Whey protein | 30.6% | 30.1% | 30.9% |
| Native whey protein | 19.6% | 19.6% | 19.6% |
| Insoluble particles of denatured whey protein | 11.1% | 10.5% | 11.4% |
| Caseino macropeptide (CMP) | 1.4% | 1.3% | 1.4% |
| Native beta-lactoglobulin (BLG) | 11.0% | 11.0% | 10.9% |
| Alpha-lactalbumin (ALA) | 4.7% | 4.8% | 4.8% |

High protein, acidified dairy products were produced from liquid composition 1-3 as described above.

The reference product A and B were produced the same way as the liquid composition 1 but with the following difference:

Reference product A: replacing above protein powder with the same amount of a milk protein concentrate powder (total protein: 81% w/w contributing with 65% w/w micellar casein and approx. 16% w/w undenatured whey protein; lactose: 2.5% w/w, lipid: 2% w/w, ash: 8% w/w).

Reference product B: replacing above protein powder with the same amount of a whey protein concentrate powder (total protein: 80% w/w contributing with approx. 78% w/w undenatured whey protein; lactose: 4% w/w, lipid: 5% w/w, ash: 3% w/w).

Results:

The high protein, acidified dairy product produced from liquid composition 1 and Reference product A were evaluated with regard to lump formation, viscosity and sensory impression.

The Reference product B gelled during pasteurisation and this milk base was not acidified or further processed.

Viscosity

TABLE 3

Viscosity data

| Product | Week 1 | Week 3 | Week 4 |
|---|---|---|---|
| high protein, acidified dairy product produced from the liquid composition 1 | 5117 | 5188 | 5584 |
| Reference product A | 7539 | 7257 | 7832 |

The viscosity of the high protein, acidified dairy product prepared from liquid composition 1 was compared with the viscosity of reference product A. The viscosity was measured according to the analysis of example 1.3.

The reference product A had a very firm network and this firm yoghurt mass was hard to swallow. The high protein, acidified dairy product produced from liquid composition 1 was less firm, smoother, and was easily swallowable at consumption.

The viscosity data is also shown in FIG. 1, where it is apparent from the figure that the viscosity of reference product A shows a high initial value, which increases over time, whereas the viscosity of the high protein, acidified dairy product prepared from liquid composition 1 has a significantly lower start value and only decreases slightly during 4 weeks shelf life.

Formation of Lumps

Figure 2A:
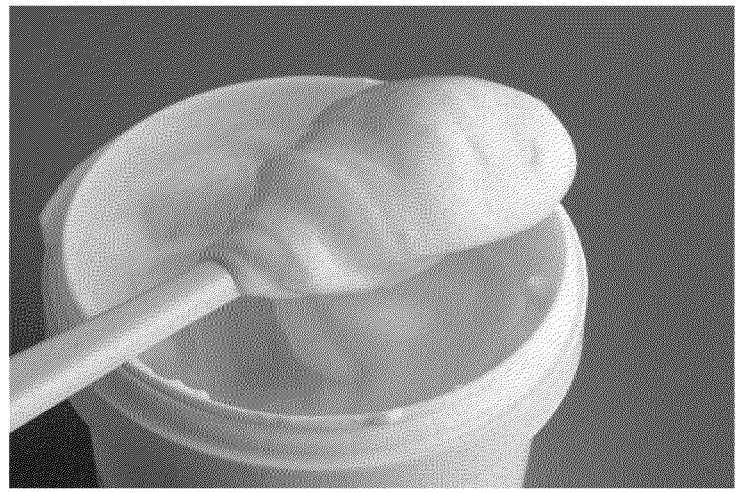
FIG. 2 shows the lump formation after 4 weeks of storage (28 days) in the high protein, acidified dairy product produced from liquid composition 1 (FIG. 2a) compared to a the reference product A (FIG. 2b).
Figure 2B:
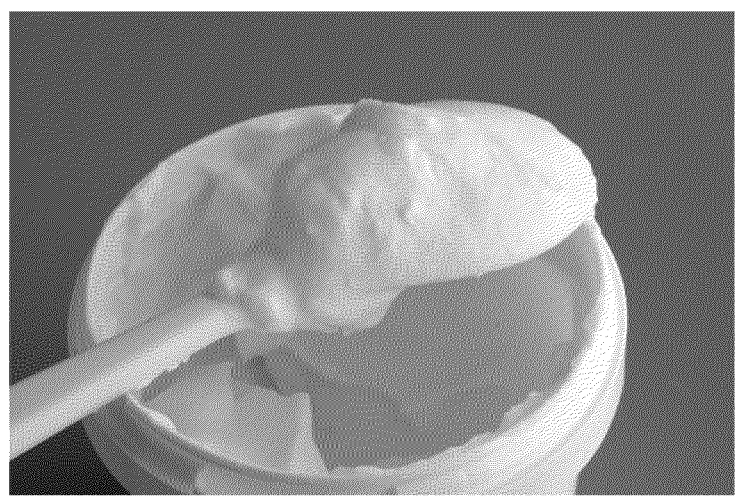

FIG. 2 shows the lump formation after 4 weeks of storage (28 days) in the high protein, acidified dairy product produced from liquid composition 1 (FIG. 2a) compared to a the reference product A (FIG. 2b).

FIG. 2a, picturing the high protein, acidified dairy product produced from liquid composition 1, shows a nice smooth product without substantial lump formation. FIG. 2b, picturing reference product A, having a pronounced formation of lumps.

Sensory Evaluation

A sensory evaluation of the high protein, acidified dairy product and the reference product A was performed in accordance with the analysis in example 1.12. The sensory panel consisted of 4 trained panellists, which evaluated the products after 1 week, 3 weeks and 4 weeks of storage at 5 degrees C.

FIG. 3 shows the result of the sensory evaluation of the high protein, acidified dairy product compared with the reference product A after 1 week of storage.

Figure 4:
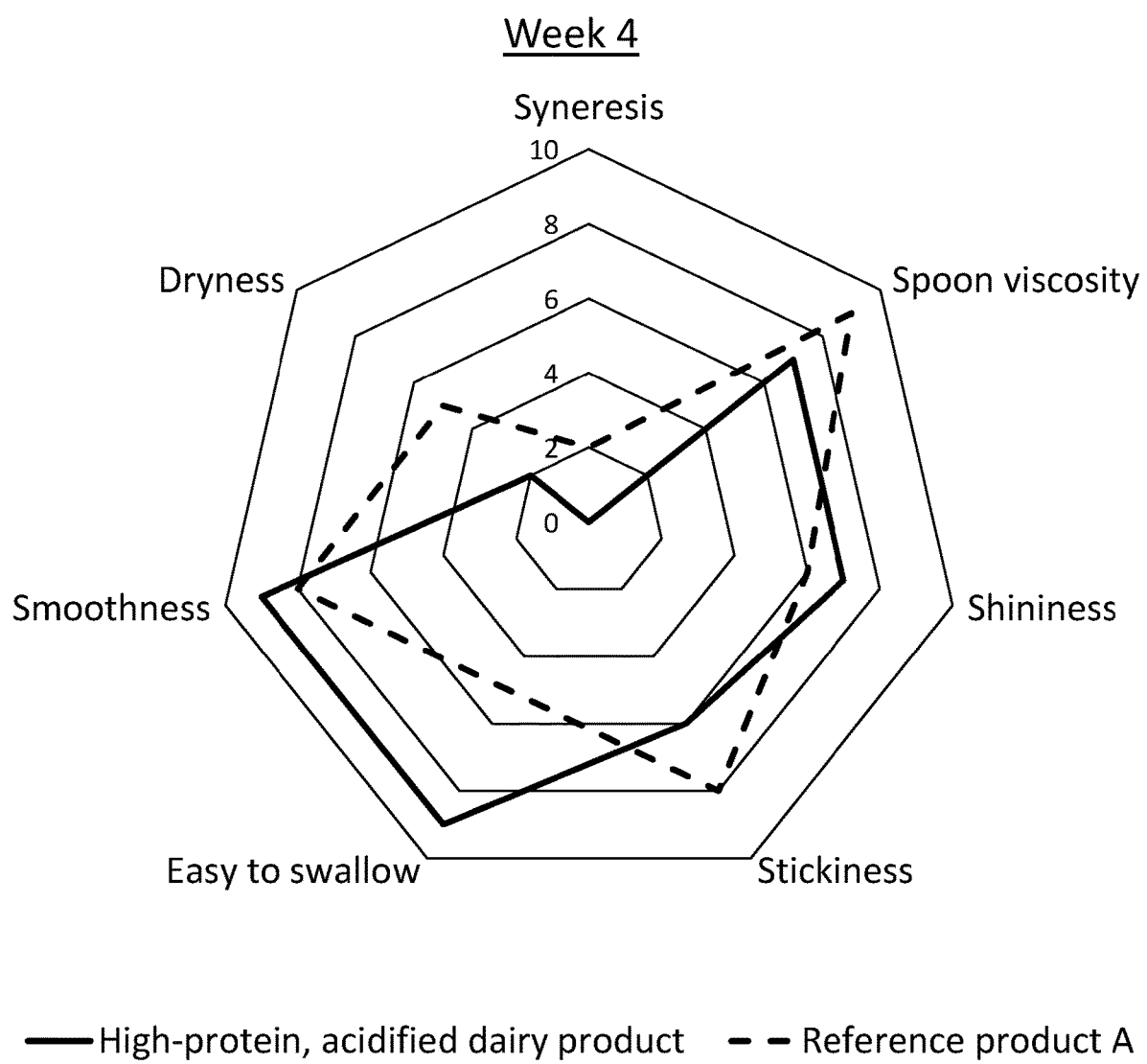
FIG. 4 shows the result of the sensory evaluation of the high protein, acidified dairy product compared with the reference product A after 4 weeks of storage.

FIG. 4 shows the result of the sensory evaluation of the high protein, acidified dairy product compared with the reference product A after 4 weeks of storage.

The high protein, acidified dairy product of liquid composition 1 was evaluated to be more shiny, smooth, less dry sensation and more easily to swallow compared to a reference product A.

The high protein, acidified dairy product is overall evaluated as having a more shiny appearance and a more smooth consistency resulting in a more pleasant mouth feeling compared to the reference product A.

In the end of shelf life (after 4 weeks of storage), the differences between the two acidified products were even more pronounced.

The invention claimed is:

1. A method of preparing a high protein, acidified dairy product comprising the steps of
   a) providing a liquid composition having a pH in the range of 5.5-8.0, which comprises
      a total amount of protein of in the range of 8-15% w/w,
      a total amount of micellar casein of in the range of 60-80% w/w based on total protein
      a total amount of insoluble particles of denatured whey protein in the range of 5-18% w/w total protein
      a total amount of non-denatured beta-lactoglobulin (BLG) in the range of 1-15% w/w total protein,
   wherein the liquid composition has a volume weighted mean particle diameter, D [4,3], of at most 50 micron, and
   b) heating the liquid composition of step a) to a temperature of at least 70 degrees C. for a duration of time sufficient to obtain at least partial microbial reduction,
   c) subjecting the heat-treated, liquid composition of step b) to at least one acidification step using an acidifying agent, thereby obtaining an acidified dairy composition,
   d) optionally, smoothening the acidified dairy composition, and
   e) optionally, packaging the acidified dairy product comprising, or even consisting of, the acidified dairy composition of step c) or step d),
   wherein the high protein, acidified dairy product has a viscosity of at least 3500 cP at a shear rate of 50/s.

2. The method according to claim 1, wherein the liquid composition contains a total amount of calcium and magnesium of at most 0.30% w/w.

3. The method according to claim 1, wherein the liquid composition has a weight ratio between protein and the sum of Ca and Mg of at least 32.

4. The method according to claim 1, containing step d) and wherein the smoothening involves the use of a slot filter, having a pore size of at most 100 micron.

5. The method according to claim 1, wherein the total amount of protein of the liquid composition is in the range of 8.5-14% w/w.

6. The method according to claim 1, wherein the total amount of protein of the liquid composition comprises in the range of 5-15% w/w of insoluble particles of denatured whey protein.

7. The method according to claim 1, wherein the total amount of protein of the liquid composition comprises in the range of 60-80% of micellar casein.

8. The method according to claim 1, wherein the liquid composition of step a) comprises an amount of total solids in the range of 4-50% w/w.

9. The method according to claim 1, wherein the liquid composition of step a) does not comprise carbohydrate-based stabilisers.

10. The method according to claim 2, wherein the liquid composition contains a total amount of calcium of at most 0.28% w/w.

11. The method of claim 3, wherein the liquid composition has a weight ratio between protein and the sum of Ca and Mg of at least 33.

12. The method of claim 4, wherein the pore size of the slot filter is at most 75 micron.

13. The method of claim 5, wherein the total amount of protein of the liquid composition comprises the range of 9-13% w/w.

14. The method of claim 6, wherein the total amount of protein of the liquid composition comprises the range of 5-13% w/w of insoluble particles of the denatured whey protein.

15. The method of claim 7, wherein the total amount of protein of the liquid composition comprises the range of 65-75% w/w of micellar casein.

16. The method of claim 8, wherein the liquid composition of claim a) comprises an amount of total solids in the range of 15-30% w/w.

17. The method of claim 5, wherein the total amount of protein of the liquid composition comprises the range of 10-12% w/w.

18. The method of claim 6, wherein the total amount of protein of the liquid composition comprises the range of 8-12% w/w of insoluble particles of the denatured whey protein.

19. The method of claim 7, wherein the total amount of protein of the liquid composition comprises the range of 68-72% w/w of micellar casein.

20. The method of claim 7, wherein the total amount of protein of the liquid composition comprises the range of 69-70% w/w of micellar casein.

* * * * *